(12) United States Patent
Renfroe

(10) Patent No.: US 10,445,819 B2
(45) Date of Patent: Oct. 15, 2019

(54) SYSTEM AND METHOD FOR INTEGRATING BUSINESS OPERATIONS

(71) Applicant: Gavon Augustus Renfroe, Birmingham, AL (US)

(72) Inventor: Gavon Augustus Renfroe, Birmingham, AL (US)

( * ) Notice: Subject to any disclaimer, the term of this patent is extended or adjusted under 35 U.S.C. 154(b) by 0 days.

(21) Appl. No.: 14/286,932

(22) Filed: May 23, 2014

(65) Prior Publication Data
US 2014/0351068 A1 Nov. 27, 2014

Related U.S. Application Data

(60) Provisional application No. 61/826,580, filed on May 23, 2013, provisional application No. 61/826,967, filed on May 23, 2013.

(51) Int. Cl.
*G06Q 10/08* (2012.01)
*G06Q 30/06* (2012.01)
*G06Q 50/12* (2012.01)

(52) U.S. Cl.
CPC ....... *G06Q 30/0641* (2013.01); *G06Q 10/087* (2013.01); *G06Q 50/12* (2013.01)

(58) Field of Classification Search
CPC .................................................... G06Q 50/12
USPC .......................................................... 705/15
See application file for complete search history.

(56) References Cited

U.S. PATENT DOCUMENTS

| | | | |
|---|---|---|---|
| 6,036,055 A | 3/2000 | Mogadam et al. | |
| 6,384,850 B1 | 5/2002 | McNally et al. | |
| 6,871,325 B1 | 3/2005 | McNally et al. | |
| 6,982,733 B1 | 1/2006 | McNally et al. | |
| 7,945,477 B2 | 5/2011 | Werbitt | |
| 8,146,077 B2 | 3/2012 | McNally et al. | |
| 2002/0095342 A1* | 7/2002 | Feldman et al. ................. 705/15 |
| 2004/0054592 A1 | 3/2004 | Hernblad | |
| 2004/0143512 A1 | 7/2004 | Sturr, Jr. | |
| 2004/0177004 A1* | 9/2004 | Mueller ................. G06Q 20/20 705/15 |
| 2007/0124209 A1 | 3/2007 | Walker et al. | |
| 2007/0130017 A1 | 6/2007 | Torres et al. | |

(Continued)

OTHER PUBLICATIONS

Renfroe, Gavon Augustus, Patent Application entitled "System and Method for Integrating Business Operations", filed Aug. 13, 2014, U.S. Appl. No. 14/458,397.
Renfroe, Gavon Augustus, Provisional Application entitled "System and Method for Integrating Business Operations", filed May 23, 2013, U.S. Appl. No. 61/826,967.
Renfroe, Gavon Augustus, Provisional Application entitled "System and Method for Integrating Business Operations", filed May 23, 2013, U.S. Appl. No. 61/826,580.

(Continued)

*Primary Examiner* — Scott A Zare

(57) ABSTRACT

A dynamic menu system comprises a server comprising a memory and a processor, a menu store, an inventory store, and at least one application stored in the memory. The menu store comprises a plurality of menu items associated with an establishment, and each menu item of the plurality of menu items comprises one or more ingredients. The inventory store comprises a record of an amount of the ingredients available at the establishment. The at least one application provides a first selection of the plurality of menu items to an electronic device, updates the inventory store to indicate that less than the certain amount of the first ingredient is available, and provides a second selection of the plurality of menu items to the electronic device. The second selection of the plurality of menu items does not include the first menu item.

30 Claims, 7 Drawing Sheets

(56) References Cited

U.S. PATENT DOCUMENTS

| | | | |
|---|---|---|---|
| 2009/0037283 A1 | 2/2009 | Anderson | |
| 2009/0069930 A1* | 3/2009 | Peters et al. | 700/236 |
| 2010/0280895 A1* | 11/2010 | Mottola | 705/14.24 |
| 2011/0093363 A1 | 4/2011 | Blatstein | |
| 2011/0191196 A1 | 8/2011 | Orr et al. | |
| 2012/0016794 A1 | 1/2012 | Orr et al. | |
| 2012/0188100 A1 | 7/2012 | Min et al. | |
| 2012/0285986 A1* | 11/2012 | Irvin | 222/1 |
| 2013/0297463 A1 | 11/2013 | Garber | |
| 2014/0244324 A1 | 8/2014 | Ford et al. | |
| 2014/0279081 A1* | 9/2014 | Marx et al. | 705/15 |
| 2014/0358742 A1 | 12/2014 | Achan et al. | |
| 2014/0365334 A1 | 12/2014 | Hurewitz | |
| 2015/0073925 A1 | 3/2015 | Renfroe | |
| 2016/0230431 A1 | 7/2016 | Renfroe | |

OTHER PUBLICATIONS

Office Action dated Feb. 9, 2015, U.S. Appl. No. 14/458,397, filed Aug. 13, 2014, 2014.

Final Office Action dated Jul. 13, 2015, U.S. Appl. No. 14/458,397, filed Aug. 13, 2014, 2014.

Advisory Action dated Dec. 3, 2015, U.S. Appl. No. 14/458,397, filed Aug. 13, 2014, 2014.

Office Action dated Feb. 2, 2018, U.S. Appl. No. 14/995,076, filed Jan. 13, 2016.

Final Office Action dated Sep. 4, 2018, U.S. Appl. No. 14/995,076, filed Jan. 13, 2016.

Notice of Allowance dated Jun. 5, 2019, U.S. Appl. No. 14/995,076, filed Jan. 13, 2016.

\* cited by examiner

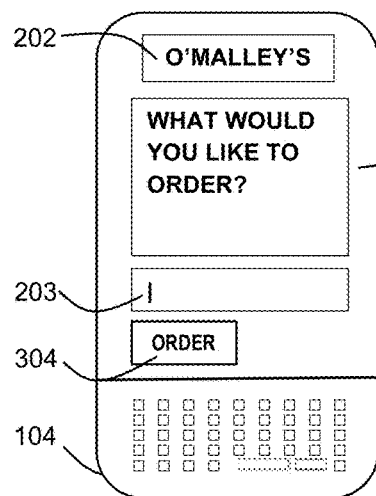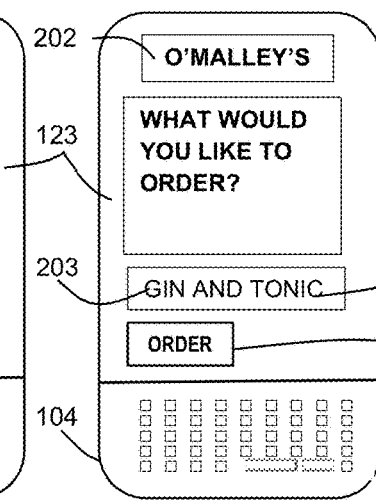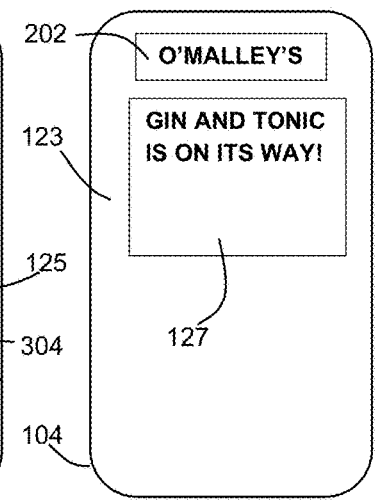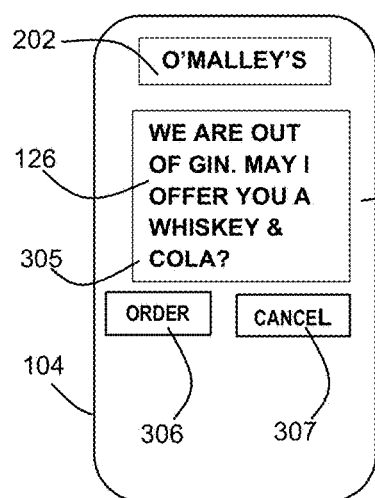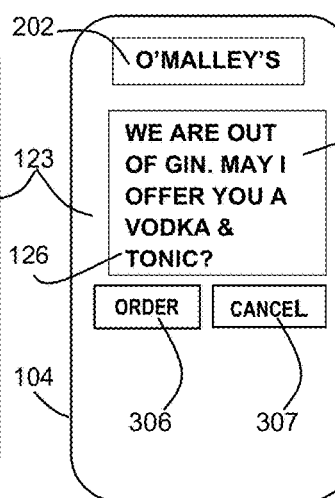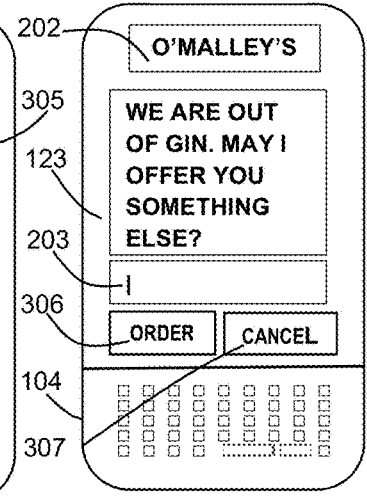

SYSTEM AND METHOD FOR INTEGRATING BUSINESS OPERATIONS

CROSS-REFERENCE TO RELATED APPLICATIONS

The present application claims the benefit of U.S. Provisional Application No. 61/826,580, filed May 23, 2013 to G. Renfroe, and U.S. Provisional Application No. 61/826,967, filed May 23, 2013 to G. Renfroe, each of which are incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a hospitality environment, such as a restaurant or bar, customers are attended to by various employees such as wait staff, bartenders, managers, etc. The flow of the business relies on the communication of the various employees to function. For example, when a customer enters a restaurant or bar, they are seated by a hostess. A hard copy of a menu is generally provided containing the available options for food and drinks. A waiter may then take their drink and food orders, which are transferred to the kitchen to prepare the food and/or the bar to prepare the drinks. Upon the completion of the order in the kitchen or bar, the status of the order can be communicated back to the waiter to deliver the food or to a runner who can deliver the food to the table. Upon the completion of the meal, the customer can typically pay at a cashier station, where the waiter may or may not act as an interface for the payment process.

SUMMARY

In an embodiment, a dynamic menu system comprises a server comprising a memory and a processor, a menu store, an inventory store, and at least one application stored in the memory. The menu store comprises a plurality of menu items associated with an establishment, and each menu item of the plurality of menu items comprises one or more ingredients of a plurality of ingredients. The inventory store comprises a record of an amount of the plurality of ingredients available at the establishment. The at least one application stored in the memory, when executed by the processor, configures the processor to: provide a first selection of the plurality of menu items to an electronic device, update the inventory store to indicate that less than the certain amount of the first ingredient is available, and provide a second selection of the plurality of menu items to the electronic device. The first selection of the plurality of menu items comprises a first menu item made from at least a certain amount of a first ingredient of the plurality of ingredients. The second selection of the plurality of menu items does not include the first menu item, and the first menu item is made with more than the certain amount of the first ingredient. The electronic device only displays the second selection of the plurality of menu items.

In an embodiment, a method of providing a dynamic menu at an establishment comprises displaying, on an electronic device, a first plurality of menu items, receiving a selection of a first menu item of the plurality of menu items, sending, by the electronic device, a menu selection message to a server, receiving a response message from the server, displaying, on the electronic device, the one or more additional items, and receiving, on the electronic device, a selection of a second item from the one or more additional items. The menu selection message comprises the selection of the first menu item, and the response message comprises a recommendation for one or more additional items.

In an embodiment, a method of dynamically controlling an inventory comprises receiving, by a server, use quantity information for a first item of a plurality of items, updating an inventory store based on the use quantity information, comparing, by the server, the quantity information with a threshold amount for the first item of the plurality of items, generating, by the server, an order message for the first item based on the comparing, and receiving an additional quantity of the first item in response to the generating of the order message. The use quantity information comprises an amount of the first item used at an establishment, and the inventory store comprises quantity information for the plurality of items available at an establishment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 2A-2F are illustrations of an electronic device communicating with a back office system according to an embodiment of the disclosure.

DETAILED DESCRIPTION

Figure 1:
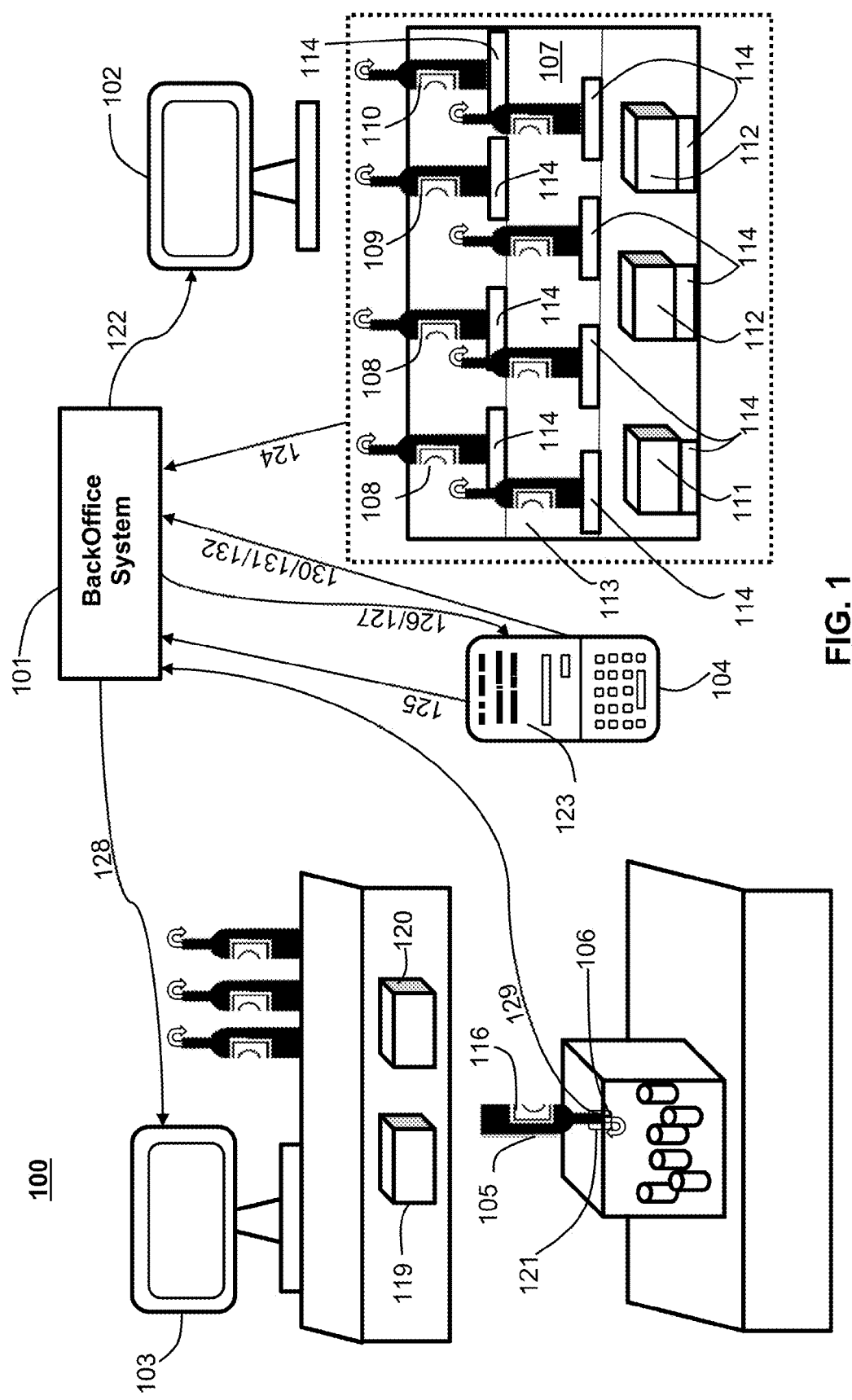
FIG. 1 is an illustration of a business establishment comprising a dynamically automated system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In a hospitality environment, a manager may be observing the entire service process. The manager may generally be aware of the types of items available on the menu and in the inventory at the beginning of a service, and the inventory may be reconciled at the end of the service. When the inventory is managed based on an available amount, inconsistencies between the sales at the cashier's station and the available inventory may be difficult to track. Further, even if the inconsistencies can be detected, the level of detail necessary to trace the inconsistencies to a single waiter or bartender is usually not available. The inventory may be restocked based on the inventory needs. For example, the inventory can be ordered on a daily or weekly basis based on the usage in the previous time period.

This process is subject to various communication breakdowns and inefficiencies. For example, the unavailability of an item presented on the menu is generally not discovered until a customer orders an item and the kitchen or bar staff identifies a shortage of the item or an ingredient in the item. Only then is the shortage communicated back to the waiter or bartender and subsequently to the customer. The customer must then review the menu again and select another item. Moreover, the multiple points of communication required between the various employees provide the opportunity for missed communications and delays in passing information and items to and from the customers. For example, the waiter may forget to place the food order with the kitchen, thereby delaying the preparation of the food until the waiter is reminded or remembers to deliver the order to the kitchen.

From a management perspective, the inventory is controlled based on a comparison of a base level of supplies that are presumed to be needed for a period of services relative to a current inventory. It may be difficult to determine or predict future usage patterns, which can result in an overstocking of perishable supplies. Alternatively, if a manager overlooks an inventory shortage or forgets to place an order, a shortage may occur during a service.

Point-of-sale systems can be used to track some aspects of the information otherwise tracked by employees. In general, a point-of-sale system consists of a terminal running software that logs the customer orders and can serve as a payment interface. Thus, the point-of-sale system may automate some aspects of tracking the number of orders and the payment for the orders while providing an additional level of detail about individual employees. However, a point-of-sale system does not interface with an inventory component or replace any employees. For example, the chain of customer care still exists in the restaurant or bar, and the point-of-sale terminal acts as a tracking device to provide some amount of information at a future time. Moreover, the point-of-sale system is generally provided in a fixed format. The lack of flexibility in setting up the system may make portions of the point-of-sale system ineffective for any particular business, potentially reducing the effectiveness of the point-of-sale system as a tracking tool.

Rather than providing a traditional point-of-sale terminal to serve as a tool for a restaurant or bar, an integrated and flexible system that more fully addresses the various aspects of the hospitality operation is described herein. In various aspects of the system and methods described herein, a system that integrates one or more of the inventory, the menu, the sales system, the communications, and the inventory management may be used to improve the service in a restaurant or bar. The system may be implemented in existing point-of-sale systems. Alternatively, the system may be implemented as a replacement for a point-of-sale system as a standalone application operable on any number and type of electronic devices. For example, the system may be implemented on a tablet, a computer, a handheld device, or the like, and when installed on multiple devices, may provide a communication path between the devices to serve as parts of the overall system.

In one aspect, the system may provide an electronic menu. When integrated with an inventory management system, the electronic menu may be dynamically updated based on the availability of items. For example, customers at the restaurant or bar would be able to view the entire menu in electronic format, which may allow for the presentation of information not normally found on a printed menu. For instance, when a customer orders a drink, the electronic menu may display a picture of the drink and information on where all of the different ingredients are from. Further, the electronic menu may also provide interesting facts about the drink, its caloric content, how many other customers have ordered the drink, and the like. The same types of information could be used for food orders as well. For example, where ingredients are sourced could be displayed on a map.

In terms of implementation, the electronic menu could be provided to the customers on a restaurant provided device such as any of the devices described above. In some cases, the electronic menu could be directly provided to a customer's device. For example, the electronic menu could be provided as an app that is available for download to a customer's handheld device. Upon loading the app, the app could communicate with the system to obtain the electronic menu and any dynamic menu updates as well as the information associated with the various options. The customer's device could communicate over a data connection or directly with a data connection provided by the restaurant or bar.

In another aspect, the system may integrate the electronic menu with the communication system within the restaurant or bar. Using the integrated system, a customer can decide on the product that they would like to order and place that order using the electronic menu. The order interface may be performed in a shopping cart style, via simple one-click or click-and-confirm ordering, and/or via a representation of the table where the customer chooses their seat and orders based on their seat location, which would allow each customer(s) to have a separate tab. The system would be able to show an order history including all of the items ordered. In some embodiments, the system could contain an interface to allow a customer to call a waiter over if necessary, but would otherwise allow the waiters to act as simple runners, thus saving on labor. In some embodiments, the interface may allow a customer to request assistance for questions (e.g., questions about the menu, business establishment, etc.). In some embodiments, the interface may include a request button, execution of which prompts a waiter to go over to the table and listen to and answer the customer's question. In some embodiments, the interface may allow a customer to enter a question and send it as a message, which then prompts a waiter to go over to the table and answer the question. In some embodiments, the interface may allow a customer to engage in a live chat session with a waiter or other individual to have questions answered.

The system may also integrate the electronic menu with the payment system and order history. For example, customers could pay their tab via the electronic device providing the electronic menu, or another device separately provided. This could be done a number of different ways. In a first example, the electronic device could include an integrated payment reader such as a credit card reader or RFID reader on the device. In a second example, the customer or waiter could type in the credit card information for a one-time purchase. In a third example, the customer could log into an online account comprising credit card information saved (e.g., integrating with a restaurant account, Amazon, Google Wallet, etc.). In a fourth example, credit card information could be stored on the actual device, which may be beneficial when the electronic menu is operating as an app running on the customer device.

In still another aspect, the system including the electronic menu may aid in food and drink selection. For example, the customer may remember what a drink is called, but not remember how to make it, or the customer may not remember what the drink is called, but know the ingredients. Alternatively, the customer may not know either of these types of information, but would like to see what drinks are available based on a specific interest, such as a specific type of drink (drinks made with vodka, martinis, low calorie drinks, etc.). Rather than having to go back and forth with a waiter or bartender, the electronic menu would allow the customer to search for drinks any of these ways and could have either a set list of drinks or a database of thousands of drinks.

The system may further integrate an inventory component that may include a dynamically updated inventory with the electronic menu. For example, a bar may not stock all of the ingredients to make a drink. As a result, the customer may order a drink only to find out when the waiter or bartender returns that the drink cannot be made. By integrating the electronic menu with the inventory, a dynamic menu may be generated that only displays those items available or with all of their ingredients available. For example, the drinks indicated as being available on the electronic menu would be based on the ingredients stocked by the bar. Thus, if an ingredient was either not stocked, or possibly out of stock, then the drink would not be available. This could include an indication on the menu that the drink is unavailable or out of stock, or the drink may not appear on the electronic menu at all. In some cases, the customer would be unable to order the drink, and/or the patron could "request" the drink so that the bar management would know that someone (or potentially many people) were interested in a certain drink and would know to stock an ingredient in the future.

In yet another aspect, the system may integrate the electronic menu with the communication system, ordering system, and a database of information related to the item(s). For example, once a drink is ordered by a customer through the system, the order would be communicated back to the bar on an electronic display. Rather than just list the orders outstanding, the display could also allow the bartender to see the instructions for how to make a drink (what ingredients, in what order, and any extra steps such as shaking it, pouring it over ice, etc.). While the orders could be placed using the electronic menu as described above, the orders could also be placed at the bar. For example, the bartender could utilize the system as a standalone system when customers are at the bar and interacting with the bartender face-to-face. In this case, when a customer orders a drink, the bartender can ring the drink up either by a name search, alcohol type, top 10 or 20 drinks ordered, etc., and it would display the same information as discussed above with respect to the electronic menu. Regardless of how the items are ordered, this would allow the same drink to be made the same way every time, and a bartender would no longer have to memorize how to make a drink.

In some aspects, the system may comprise an inventory management component, which may be dynamically updated. In this embodiment, the system would allow the stocking clerk to key in (via manual type, barcode scanning, etc.) all of the available items in stock into an inventory list. The list could then be populated into the system tied into the electronic menu and ordering. For example, the inventory could be integrated with the electronic menu to provide the items that are available for ordering as described above. The inventory management component could either require the stocking clerk to key in updates on a regular basis in order to keep a rough estimate of how much was in stock to integrate with the sales system to estimate the amount of product sold, or have an automated measurement system for determining the amount of product sold without user input. The inventory management system would allow a bar owner to see everything that was in stock in real-time or near real-time, adjust or order new inventory when necessary, as well as provide an additional level of granularity to detect if anyone was stealing and/or know if he was wasting money stocking products that were not big sellers, etc.

In still another aspect, the inventory management component may be used to predict and/or automate inventory ordering. For example, the inventory information being input into the system may allow the management to know how much is being used and when. Such a system can potentially provide even more granular information when the electronic menu as described above is utilized to order items, such as drinks, electronically. The information can then be analyzed using data modeling to predict patterns and plan accordingly. For instance, a bar and restaurant owner may see a large spike in mimosa and Bloody Mary orders on a Sunday for brunch. The system could be used to detect and predict that every Sunday there will be a spike in these orders. Based on the available inventory information, the inventory management component could also have the ability to determine the amount of champagne and orange juice, or vodka and tomato juice, to stock in order to meet historical demand for the past month's worth of Sundays, or the past year's worth, or the past three years' worth, etc., including taking into account growing business and special occasions. The system could also analyze data relating to local events, which tend to drive customer behavior. For example, the system could receive input that a high school football team home game is scheduled for a particular day and that customers tend to order large quantities of food after high school football team home games. Hence, the system can automatically order large quantities of food so to be ready for the day of the game. The predictive nature of the inventory management component would allow a bar owner to plan ahead and order product to avoid shortages while not overstocking product to the extent that it results in waste or taking up excessive inventory and storage space.

Further, the inventory management system can use the predictive nature of the inventory to automatically place product orders on an appropriate time basis. For example, the system could automatically submit orders for the bar owner directly to vendors (via e-mail, fax, an online request, etc.), so that the bar owner never has to worry about inventory. The system would allow the owner to change or limit parameters—such as being able to key in additional items in preparation for a special event, or requiring his approval before making a purchase over a certain dollar amount, but the system could otherwise act autonomously. The system could also automatically perform system validations to detect anomalies that are indicative of stealing or free pouring by staff.

Still further, the system could provide opportunities for additional revenue for the bar or restaurant. By integrating the system as described herein, the bar owner would have a variety of information available to indicate what the customers are ordering, when they're ordering, and at what price points they're ordering; it could also be determined, whether the customer is logging in, paying through a trackable means (e.g. Amazon, Google Wallet), or via identification of the patron through the use of all or a portion of their card number (e.g., the last four digits of their card), the card type, and their name, by which the system can recognize individual patrons and their orders. This allows individual customer data to be tracked, logged, and used to create a customer profile. Using the customer profile, the individual customers can be targeted for offers, advertisements, or deals. For example, a customer could be recognized simply based on the last four digits of his credit card number, his name, and his credit card type. The customer profile could indicate that he always comes in and orders a certain brand and style of wine. When the system recognizes the customer based on the customer information (e.g., whether at the beginning of their visit or the end), the system can present that customer with the offer to try a different wine that's similar to the one the customer always orders. The offer could possibly include the different wine at a discount for the first glass, which the system can then track. Alternatively, the system could alert the customer that there is a sale of their favorite wine at the co-owned wine store next door. If the customer has provided, or offers to provide, their e-mail address, it could then add them to a list to provide similar incentives to come to the establishment. The information provided in the responses to the offers could then be used to update the customer profile for use in providing future offers.

All of the aspects of the system described herein can be implemented in a variety of ways. The system can be implemented as an add-on to an existing point-of-sale system. Alternatively, the system could be implemented as a standalone application running on one or more devices. For example, the system may be considered a point-of-sale app that can operate on any device (be it tablets, smartphones, or computers). While the system can run and operate on a single device, the system could also include a distributed configuration in which one or more aspects of the system operate on a plurality of devices in communication with each other. For example, the app providing the electronic menu could potentially integrate with the rest of this system (ordering, dynamic menu, inventory management, drink making instructions, etc.). The integrated system would then provide the restaurant or bar owner a better point-of-sale system.

The system could include a number of default templates for presenting the various aspects of information to the employees, management, and customers. A restaurant or bar owner can start with a template to begin, but the system would allow the owner or system administrator to easily create, drag and drop buttons (like icons on a computer desktop or an iPhone), rename them, change what they do in an easy-to-use interface, and the like. Unlike current point-of-sale systems where the updates (e.g., software updates) are pushed out from the franchisee/manufacturer/etc., the bar owner could distribute (e.g., push) the system updates that they make out to other devices within their bar ecosystem. For example, if the system presents a grid interface (e.g., a 10×10 display) and the system administrator, such as a bar owner, made a button bigger, changed the price of a drink, or moved a button around, the system would distribute the change(s) to the other devices (e.g., one on another floor, behind the bar, on a server's iPhone, etc). Thus, the system would enhance the interaction between the various components of the system such as the electronic menu, displaying items that were ordered, and the inventory management component (alerting you that you were out of vodka, etc.).

FIG. 1 illustrates a dynamically automated system 100, which is capable of integrating operations at a business establishment. The system 100 may be employed at any type of business establishment, especially those pertaining to the food service industry. In the particular embodiment shown in FIG. 1, the system is utilized within a bar operation offering at least beverages to patrons, though the system may be equally applicable to a restaurant operation operating at least food to patrons.

The system 100 may comprise a back office system 101 for facilitating various facets within the business operations. The back office system 101 may comprise a database containing menu item availability data 124 related to the availability of menu items and/or ingredients for making the menu items available to customers. In an embodiment, the back office system 101 may comprise one or more electronic computing devices located at the business establishment. For example, the back office system 101 may be implemented on one or more mobile devices. This embodiment may allow the entire system to be operated from mobile devices within the establishment without the need for an expensive and dedicated computer or server. Alternatively, the back office system 101 may comprise one or more devices located offsite that are communicatively coupled to the business establishment systems. In some embodiment, the back office system 101 may operate based on a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider. For example, the back office system 101 could be hosted by Amazon AWS—the licensing company providing the system 100—and/or by the business establishment owner, and the back office system 101 could be coupled by a network connection (e.g., wired connection, wireless connection, etc.) to the business establishment. In some embodiments, the third party services may provide the entire back office server function, and the third party service may be provided to a plurality of unrelated establishments and/or businesses.

The back office system 101 may be configured to communicate with an electronic device 104 such that a customer may use an electronic device 104 that is either his own device or a provided device to order an item for purchase. For example, the customer may use an interface 123 of the electronic device 104 to send an order request message 125 to the back office system 101 to request an item for purchase.

The electronic device 104 may communicate with the back office system 101 through a wired, wireline, or wireless access point. In an embodiment, a base transceiver station may provide a wireless communication link to the electronic device 104 and communicatively couple it to other components of the system 100 such as the back office system 101. In an embodiment, the base transceiver station may provide a wireless communication link to the electronic device 104 according to one of a code division multiple access (CDMA) wireless protocol, a global system for mobile communications (GSM) wireless protocol, a long term evolution (LTE)

wireless protocol, a worldwide interoperability for microwave access (WiMAX) wireless protocol, or another wireless communication protocol. In some embodiments, a wireless access point may communicatively couple the electronic device 104 to the system 100. The wireless access point or other wireless local area network (WLAN) access point may provide a wireless link to the electronic device 104 and/or a network communicatively coupled to the system 100. A number of wireless communication protocols may be used, including, but not limited to, WiFi, Bluetooth®, and the like.

In an embodiment, an electronic device 104 may be assigned a password to connect through a secured wireless access point (e.g., a WiFi router). A variety of passwords can be used and assigned to a customer. For example, the password may be unique to a customer profile, unique to a credit card associated with the customer (e.g., the last name of the customer, a portion of the credit card number, the expiration date of the card, or any combination thereof), or simply a randomly assigned password for the customer. The password may assist in limiting the access to the system and/or identifying the customer during the communications between the electronic device 104 and the remainder of the system 100 (e.g., the back office system 101).

The electronic device 104 may also be configured to identify the location of a customer for purposes of delivering the item once it is prepared. In an embodiment, the electronic device may be assigned and locked to a specific table or location in the business establishment, which may comprise a setting within the application executing on the electronic device 104. In order to assign the device to the location, the device may be provided by the business establishment to the customer at the specific location. In some embodiments, the device may automatically identify its location, thereby allowing the device to be used at different locations within the business establishment. For example, the device may be configured to read a near field communication device such as an RFID tag associated with the table or to scan a symbol (e.g., a barcode) at the table. Alternatively, a radio communication such as a Bluetooth® communication may be used to self-locate the device within the restaurant. The ability of the device to self-locate within a restaurant may allow the device to be a restaurant provided device or a customer's own device. In some embodiments, the customer could register their location by typing in a table identifier into the interface 123 on the electronic device 104.

The ability of the electronic device 104 to be located within the business establishment may allow the customers to individually pay their tabulated bill. For example, the electronic device 104 may access a data store having a representation of the table or seat where the device is located. In some embodiments, the customer may be enabled to select from a table description and/or diagram (two person, three, four, six, square, round, etc.) to indicate the number of customers at the table and what portion of the bill each customer would be responsible for paying. The customer could select their seat and/or any other number of seats, or itemized purchase selections, and pay the bill using the interface on the electronic device 104. The payment could be completed using any of the payment methods described herein. The customers could pass the electronic device 104 around so everyone could pay if a single electronic device was present, or the customers could each pay with separate devices (e.g., their own electronic devices). The ability for the customers to individually pay may provide a flexible system that can improve customer satisfaction.

Upon receiving the order request message 125, the back office system 101 may evaluate the menu item availability data 124 stored in the database to determine whether or not the order request can be fulfilled. If, based on evaluating the menu item availability data 124, the back office system 101 determines that one or more ingredients are out of stock to fulfill the order, then the back office system 101 may send a negative order response message 126 indicating that the order request cannot be fulfilled. If, based on evaluating the menu item availability data 124, the back office system 101 determines that each ingredient for fulfillment of the order request is in stock, then the back office system 101 may send a positive order response message 127 to the electronic device 104 indicating that the order can be fulfilled. A more detailed explanation of the communication between the electronic device 104 and the back office system 101 is included below in the descriptions of FIGS. 2A-2F.

In some embodiments, the back office system 101 may comprise an inventory component integrated with the item availability data 124 and the interface 123. In this embodiment, the back office system 101 may determine when an item is unavailable in inventory or the amount of the item is below a threshold in inventory. The back office system 101 may update the menu on the interface 123 to indicate that the item is unavailable for example, by including a label such as "out of stock" or "unavailable," or displaying the item in a color or pattern to indicate that it is unavailable. In some embodiments, the item may be removed from the interface 123 when it is determined to be unavailable, thereby ensuring that the items displayed in the interface 123 are available for order. In some contexts this may be referred to as a dynamically updated electronic menu. In this embodiment, the positive order response message 127 may not be needed since the order is pre-verified as being available.

The back office system 101 may process an order by sending an order fulfillment message 128 to an order preparation display 103 (e.g., a display for a bartender, waiter, or kitchen staff). The order preparation display 103 may be located such that a bartender may view the order fulfillment message 128 on the order preparation display 103 to be prompted to fulfill the order (e.g., pour an ordered mixed drink). The back office system 101 may receive a plurality of orders from one or more customers. A queuing mechanism may be used to order the plurality of orders within the system for preparation. For example, a first-in first-out queuing mechanism may be used to arrange the orders sent to the order preparation display 103. In some embodiments, the orders may be arranged based on a customer status (e.g., a VIP, frequent customer, etc.), time since the order was placed, order value (e.g., cost and/or profit of the order), the amount of time since a previous order, and the like. In some embodiments, similar orders from different customers may be grouped or collected to improve the efficiency in preparing the orders. When the plurality of orders has been arranged according to the appropriate queuing mechanism, the orders may be sent to the order preparation display 103 for display to the appropriate order preparation personnel.

In processing the order, the back office system 101 may also serve as a point-of-sale terminal and carry out a sales transaction for the purchase. For example, in some embodiments, the customer may enter his credit or debit card information via the electronic device interface 123. In some embodiments, the customer's order may be processed via a payment processing vendor (e.g., PayPal). In some embodiments, the customer's order may be added to a running tab, for which the customer or a third party is responsible. In some embodiments, the back office system 101 may prompt a transaction to take place at a separate point of sale terminal (e.g., a cash register monitored by the bartender). In still other embodiments, the customer's payment information may be stored on the device providing the electronic device interface 123. For example, the device may be the customer's own device executing an application that provides the electronic device interface 123. In this embodiment, the customer's information may be stored on the electronic device and used to provide the payment information for completing the customer's purchase transaction.

The back office system 101 may be communicatively coupled to a stocked inventory tracking means 107 and use inventory tracking means 106 for promoting inventory management. In an embodiment, the stocked inventory tracking means 107 may monitor quantities of various items the business has in stock. While FIG. 1 shows the stocked inventory tracking means 107 monitoring quantities of five stocked items (e.g., gin 108, vodka 109, whiskey 110, cola 111, and tonic water 112), the mention of five items is illustrative and the stocked inventory tracking means 107 may be configured to monitor any number of items.

In operation, the stocked inventory tracking means 107 may receive initial input indicating an initial stocked quantity of a particular item 108-112. In some embodiments, the stocked inventory tracking means 107 receives initial input manually by a user using various input devices (e.g., via a keyboard, mouse, scanner, barcode reader, near field communication device, etc.). In other embodiments, the stocked inventory tracking means 107 may calculate initial input by way of automated means. For example, the stocked inventory tracking means 107 may include a shelf 113 comprising stock scales 114. The stock scales 114 may be configured to measure the weight of a particular item thereon. Based on the weight of the item, the stocked inventory tracking means 107 may calculate the stock inventory amount of the item. In some embodiments, the stocked inventory tracking means 107 is separate from the back office system 101 and communicates the stocked inventory amount to the back office system 101. For example, the stocked inventory tracking means 107 may comprise a transmitter for sending a message indicating the stocked inventory amount to the back office system 101. In other embodiments, the stock inventory tracking means 107 makes up a part of the back office system 101 itself.

The back office system 101 may comprise a database for storing data relating to a stock inventory amount for each item 108-112. Thus, the back office system 101 may be capable of monitoring the stocked inventory amount for one or more, or in some cases every, item 108-112 based on information received from the stock inventory tracking means 107.

The back office system 101 may be communicatively coupled to an inventory use tracking means 106. The inventory use tracking means 106 may be configured to track in substantially real-time an amount of an item as it is used (e.g., poured to make a drink, spilled, etc.). The inventory use tracking means 106 may incorporate any kind of means for monitoring quantities of an item as it is used. For example, the tracking may occur via a point-of-sale terminal (e.g., the point-of-sale terminal may communicate to the back office system 101 that one shot of gin was rung up in a transaction and therefore that one shot of gin was used); via an electronic spout (e.g., an electronic spout may measure fluid flow through the spout and communicate the measured data to the back office system 101); via a flow meter (e.g, a flow meter on a keg or a pour count); via motion sensing means (e.g., the bottle includes a motion sensor that can sense a pour being made and the duration of the pour to calculate an amount of liquid displaced from the bottle and communicate the amount to the back office system 101); via a weight sensor (e.g., each bottle may have its place on a shelf at the bar, the bottom of which is a scale that can weigh the bottle and contents therein to determine an amount of a beverage remaining in the bottle); via input (e.g., an electronic button/transmitter for placement on the bottle wherein, when a bartender pours a drink, his hand executes the button on the bottle to signal each shot that is poured, and the transmitter then transmits a signal to the system to communicate each shot that is poured); or via any other means. Further examples include the use of an input by the bartender to indicate that a new bottle has been added or opened, the use of a readable tag (e.g., a barcode, etc.) and/or a near-field communication device (e.g., an RFID tag) on the bottle to provide an input to the system that a bottle has been added or placed in the bar area, and/or the use of a readable tag (e.g., a barcode, etc.) and/or a near-field communication device (e.g., an RFID tag) on the bottle to provide an input to the system that a bottle has been removed or disposed of in the bar area.

In the particular embodiment illustrated in FIG. 1, the inventory use tracking means 106 comprises an electronic spout 121 that can measure fluid flow therethrough to determine an amount of fluid exiting the bottle 116 and thereby track an amount of liquid that is left in the bottle 116. In some embodiments, the inventory use tracking means 106 comprises a keg monitor comprising a sensor, counter, or other input device enabling the pour rate from a keg to be monitored. The keg monitor can measure pour rate from a keg to determine an amount of fluid exiting the keg and thereby track an amount of liquid that is left in the keg. The inventory use tracking means 106 may compare the pour rate from the keg with the number of drinks sold, which may allow for a determination of how many drinks are obtained from the keg. The amount of liquid in the keg can also be tracked to determine when the keg should be switched.

The inventory use tracking means 106 may communicate the remaining amount of an item to the back office system 101. In some embodiments, the inventory use tracking means 106 communicates the amount to the back office system 101 each time the amount changes (e.g., each time a drink is poured, spilled, etc.). In other embodiments, the inventory use tracking means 106 communicates the amount to the back office system 101 at predetermined intervals (e.g., every minute, every ten minutes, every hour, once a day, twice a week, etc.). In some embodiments, the inventory use tracking means 106 communicates the amount to the back office system 101 upon the amount equaling less than a threshold amount. For example, when the bottle 116 has less than five fluid ounces of liquid in it, then the inventory use tracking means 106 may send a message to the back office system 101 that the bottle 116 on the floor is running low.

In some embodiments, when the back office system 101 receives a message that the amount of an item is running low, the back office system 101 may present an indication to refill the ingredient. For example, the back office system 101 may send an inventory message 122 to a management display 102 that the product in bottle 116 on the floor needs to be restocked. In turn, a bar-back, bartender, or any other individual may respond to the inventory message 122 and bring a stocked bottle of gin 108 from the stockroom 107 onto the floor.

Upon the bottle of gin 108 being brought from the stockroom 107 onto the floor, the stock inventory amount for gin 108 will decrease. In an embodiment, inventory notices and restocking requests/actions may be performed based on various considerations and thresholds. For example, when the stock inventory amount of an item falls below a threshold amount, then a message may be sent to indicate the amount of the item. For example, the message that more of the item should be purchased may be sent to the management display 102 or to another display (not shown). In some embodiments, the message may comprise an email or text message sent to a procurement manager. In some embodiments, when the stock inventory amount of an item falls below a threshold amount, then more of the item is automatically ordered (e.g., the back office system automatically updates or creates a purchase order to a supplier requesting more of the item). The threshold amount may be fixed (e.g., a case of gin) or dynamic. A dynamic threshold may be based on expected usage amounts or rates. The expected usage amounts may affect the threshold by ensuring that more of the item or ingredient is on hand when needed by taking into account ordering times and delivery delays. For example, the threshold may comprise a case of gin for a weekday or four cases of gin for the week before a holiday weekend, based on the higher expected usage during the holiday weekend, while taking into account the lead time to order and receive the extra stock. A dynamic threshold may be based on current inventory amounts or usage rates. For example, when the usage rate of an item is twice the expected or predicted rate, the threshold amount to trigger re-ordering may be double. This may ensure that additional stock is ordered before the supply reaches zero in a certain period of time (e.g, a fixed order and delivery period). As described in more detail below, the amount of the item ordered may comprise a fixed amount, an amount based on the expected use in a given time period and/or storage space, and/or a predicted amount based upon information and data accumulated by the system (e.g., predictive ordering based on data mining of the back office system 101 data). Additional considerations useful in generating inventory notices and restocking and/or reordering requests can include the usage and/or consumption rate of the item, the predicted usage for a given time period (e.g., the predicted amount exceeds the current or expected inventory), and the like.

In some embodiments, when the stocked inventory amount of an item reaches zero and when the remaining amount of the item measured via the inventory use tracking means falls below a threshold amount (e.g., the amount of the item left in the bottle 116 on the floor is less than 1 oz.), then the back office system 101 will determine that there is not any more of the item available for customers. In turn, the back office system 101 may update menu item availability data 124. In turn, the current system helps ensure that an order response message 126, 127 sent to a customer accurately reflects the most up-to-date information. As noted above, the determination that there is not any more of the item available for customers may be used to dynamically update the electronic menu: for example, by removing items no longer available or changing their appearance to indicate that the items are unavailable.

In some embodiments, the stocked inventory amount of an item may exceed an expected usage threshold. The expected usage threshold amount may be fixed (e.g., a case of gin, twenty pounds of beef, etc.) or dynamic. A dynamic threshold may be based on expected usage amounts or rates based on past sales information. The expected usage threshold may be used to provide discounts when the inventory of an item exceeds the expected usage threshold. The expected usage threshold may be used with perishable items such as fresh food, items with expiration dates, such as canned or frozen goods, or items taking up storage space that are not selling at the expected rates. When the inventory amount of an item exceeds the expected usage threshold, the system may send a message to the back office system 101 to provide a discount or other incentive to sell the item. The back office system 101 may update the menu on the interface 123 to indicate that the item is available at a discount to incentivize sales of the item. It will be appreciated by those skilled in the art that some or all of the components illustrated in FIG. 1 may not be present while remaining within the scope of the current disclosure.

Turning now to FIGS. 2A-2F, illustrated are embodiments of an electronic device 104 as it is communicating with a back office system 101 according to an embodiment. The electronic device 104 may be any known electronic device capable of communicating with the back office system 101. For example, in some embodiments, the electronic device comprises a mobile device. In other embodiments, the electronic device comprises at least one electronic tablet.

In some embodiments, a customer may communicate with his electronic device 104 to the back office system 101 via an electronic device application. The application may be provided by any entity, including the business establishment itself or a third party. The application may provide on the electronic device's 104 display an interface 123 that allows a customer to communicate with the back office system 101. The interface 123 may be customized according to a business establishment's preferences through the use of formatting and/or customized indicia 202.

FIG. 2A shows the interface 123 as it provides means for a customer to place an order requesting one or more items. In the particular embodiment shown in FIG. 2A, the interface 123 comprises a field 203 in which a customer may enter an order request.

FIG. 2B illustrates the interface 123 after an order request has been entered. Upon the customer executing the "order" button 304, the electronic device 104 is prompted to send an order request message 125 to the back office server indicating the entered order request.

FIG. 2C shows the interface 123 after the electronic device 104 has received a positive order response message 127 from the back office system 101. As shown, the interface notifies the customer that the order request is being fulfilled.

FIGS. 2D-2F, on the other hand, each show an embodiment of the interface after the electronic device 104 has received a negative response message 126 from the back office system 101. The negative response message 126 may also include a substitution inquiry 305 asking whether the customer would like at least one substitution. As discussed in more detail herein, the system may dynamically update the electronic menu to remove any items that are unavailable prior to a customer being able to enter the order request. In this embodiment, the negative response message 126 may not be sent to the interface of the electronic device 104.

In the particular embodiment shown in FIG. 2D, the back office system 101 determines the substitution based on the customer's purchase history (e.g., using a customer profile), and a current state of inventory. For example, when the customer sends the order request message 125 to the back office system 101, the order request message 125 may include data identifying the customer and/or the electronic device 104 to the back office system 101. The data identifying the customer and/or the electronic device may include, but is not limited to, a credit card number, a portion of a credit card number (e.g., the last four digits), the customer's name, the credit card type, the credit card expiration date, a device identifier, a user name if the customer has logged into a system, any customer provided identifying information (e.g., a rewards card number, a rewards program ID, etc.), and/or any additional type of identifying information. Based on such data, the back office system 101 may identify a purchase history associated with the customer. The back office system 101 may analyze the customer's purchase history to determine at least one appropriate substitution. For example, if the order request message 125 from the customer is for a gin and tonic but the business establishment is out of gin, the back office system 101 may analyze the customer's order history to find that the customer usually orders whiskey and cola. The back office system 101 may then analyze the menu item availability data 124 to determine whether enough whiskey and cola are in stock so to fulfill an order request for a whiskey and cola. Upon the back office system 101 determining that sufficient amounts of whiskey and cola are in stock, the back office system 101 may promote transmission of a negative order response message 126 that indicates the establishment is out of gin and that includes a substitution inquiry 305 asking whether the customer would like to instead order a whiskey and cola or, alternatively, refrain from moving forward with the order. The interface 123 may provide a substitution selection button 306, execution of which sends an alternate order request message 131 to the back office system, and a cancel button 307, execution of which terminates the particular transaction.

In some embodiments, the back office system 101 may determine that an item is out of stock and remove it from the menu prior to the menu being presented to the customer. In this instance, the back office system 101 may identify a purchase history associated with the customer based on the identifying information. The back office system 101 may analyze the customer's purchase history to determine at least one appropriate substitution as described above. The electronic menu may then be dynamically updated for the particular customer with the appropriate substitution. For example, the electronic menu may be updated to indicate that the establishment is out of gin and rather present the customer with the option to order a whiskey and cola.

In the particular embodiment shown in FIG. 2E, the back office system 101 may determine a substitution based on the metadata associated with interrelationships among menu items and/or ingredients of menu items. The metadata may pertain to which ingredients typically accompany one another in various recipes, which ingredients are frequently substituted for one another, scientific information relating to how various ingredients react with one another, etc. Thus, the back office system 101 may analyze the metadata to determine an appropriate substitution to offer the customer. For example, if the order request message 125 from the customer is for a gin and tonic but the business establishment is out of gin, the back office system 101 may analyze the metadata and determine that vodka is an appropriate substitution for gin. In some embodiments, the determination may be based on metadata indicating that many members of the public tend to substitute vodka for gin. In some embodiments, the determination may be based on metadata indicating that gin reacts to tonic water similarly to how vodka reacts to tonic water. In some embodiments, the determination may be based on metadata that was manually entered and indicates that vodka is an appropriate substitution for gin. Upon the back office system 101 establishing at least one substitute (e.g., a vodka and tonic), the back office system 101 may then analyze the menu item availability data 124 to determine whether enough vodka and tonic water are in stock so to fulfill an order request for a vodka and tonic mixed beverage. Upon the back office system 101 determining that sufficient amounts of vodka and tonic water are in stock, the back office system 101 may promote transmission of a negative order response message 126 that indicates the establishment is out of gin and then asks if the customer would like to instead order a vodka and tonic or, alternatively, refrain from moving forward with the order. The interface 123 may provide a substitution selection button 306, execution of which sends an alternate order request message 131 to the back office system, and a cancel button 307, execution of which terminates the particular transaction.

In the particular embodiment shown in FIG. 2F, the negative response message 123 includes another field 203 in which a customer may enter an alternate order request. It will be appreciated by those skilled in the art that while FIGS. 2D-2F show three separate interface options, the options may be combined in any manner of ways. For example, the negative order response message 123 may prompt an interface 123 displaying at least one determined substitute order (as shown in FIG. 2D and/or FIG. 2E) and also a field 203 for entering an alternate order request.

One skilled in the art will appreciate that a substitution may be determined through any type of appropriate analysis and that the analyses described above are illustrative. For example, the back office system 101 may analyze the metadata in the database to determine an in-stock substitution for an out-of-stock ingredient based on the manner in which the out-of-stock ingredient relates to other ingredients in the menu item. In turn, based on the metadata, the back office system 101 may select a substitute ingredient that relates to the other ingredients similarly to how the out-of-stock ingredient reacts. In some embodiments, the metadata may provide an indication as to how various ingredients relate to one another. In some embodiments, mixologists or other industry experts may provide recommendations for substitutions of ingredients or items as a whole. In some embodiments, the back office system may notify a bartender that an ingredient is out-of-stock and recommend a plurality of other in-stock substitute ingredients as options for appropriate substitutes. Thus, the bartender may himself select the particular substitute ingredient from the plurality of substitute ingredients and/or an entire substitute item, thereby contributing his own creativity to the drink-making process. In some embodiments, while the bartender is working a shift, the bartender may enter into the back office system data regarding substitutions and customer feedback associated therewith. In some embodiments, when a customer receives a mixed drink comprising a substituted ingredient, the customer may rate the substitution (e.g., via a message sent using the electronic device) to indicate the customer's satisfaction, or lack thereof, with the substituted drink. The system may then present future substitution suggestions based on the scores or other indicators (e.g., the most frequently substituted, etc.). Thus, the system may provide up-to-date and creative substitution recommendations, which may be driven by a variety of opinions and customer feedback.

In an embodiment, the system may implement a model to predict and track anticipated usage of the various ingredients and/or menu items. The model may be generated by the back office server using past purchase data, customer profiles, data from a particular establishment, and/or data from multiple establishments. The model may analyze the existing data and determine usage patterns, usage rates, correlations between items, and/or correlations between ingredients. For example, the model may determine various expected usage rates for different time periods, such as the time of day, day of the week, special occasions, month of the year, or a season. Upon implementing the model, the model may be used to predict a usage amount in a given time period, a predicted usage rate, or the like. The integrated inventory system may then track the usage amounts on the floor, the stock room, or other inventory store, and compare the results to the expected amounts predicted by the model. The results of the comparison may be used to update the inventory (e.g., order additional items/ingredients), identify new purchasing trends, and identify associated items (e.g., associated menu items, associated ingredients, menu items associated with various ingredients, etc.), identify advertisements related to various items, and the like. The model may be updated in near real time based on the inventory tracking systems and methods described herein. For example, an amount of gin can be tracked based on each sale, each pour, etc. and the inventory updated using the model operating on the server. In some embodiments, the model may operate on one or more electronic devices, and in some embodiments, the model may operate across a plurality of electronic devices.

Figure 3:
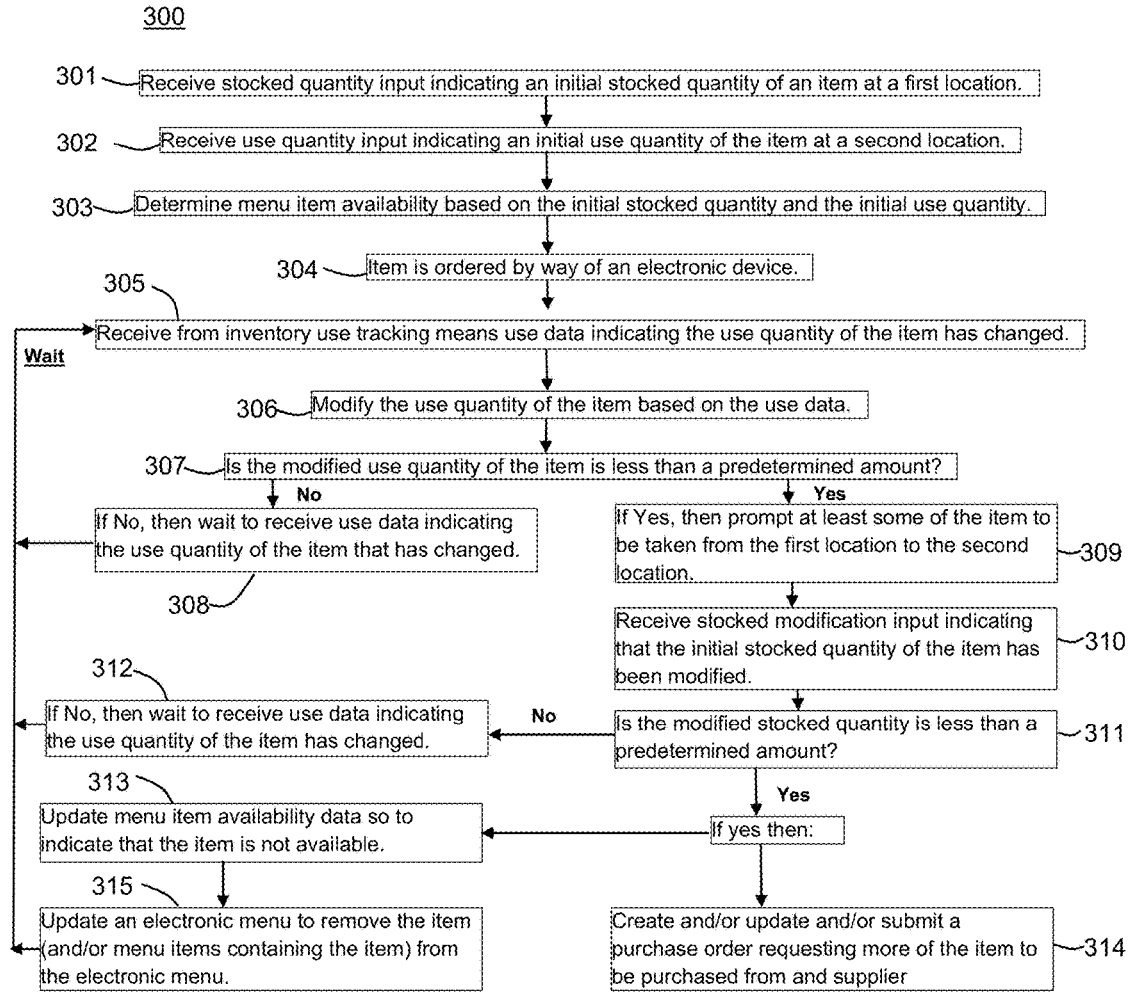
FIG. 3 is a method for monitoring inventory according to an embodiment of the disclosure.

Turning now to FIG. 3, depicted is a method for monitoring inventory 300 according to an embodiment. In step 301, the system receives an input indicating an initial stocked quantity of at least one particular item at a first location. In step 302, the system receives input indicating an initial quantity of the at least one item on the floor at a second location. In step 303, the system determines menu item availability data 124 based on the initial stocked quantity and the initial quantity of the at least one item on the floor. In step 304, an item is ordered by way of an electronic device 104, where an order request message 125 can be sent to the back office system 101 and a positive order response message 127 can be returned to the electronic device 104. The ordering of the item may be achieved according to an embodiment as described below with reference to FIG. 4. In step 305, the system receives from the inventory use tracking means 106 use data 129 indicating that an amount of a particular item that has been used. In step 306, the system calculates an updated quantity of the at least one item on the floor based on the use data 129 received from the inventory use tracking means 106.

In step 307, the system determines whether the updated quantity of the at least one item on the floor is less than a threshold amount. In step 308, the system determines that the updated quantity is not less than the threshold amount and so it waits until another order is processed. Alternatively, in step 309, the system determines that the updated quantity is less than the threshold amount, and based on the determination, initiates an action (e.g., sends a message to the management display 102) to have a stocked item taken from the inventory supply 107 onto the floor and/or ordered to replenish the inventory supply 107. In some embodiments, the updated quantity may be more than the threshold amount and thereby trigger the action to have the item taken from inventory and/or ordered. For example, when the threshold is a threshold usage rate, the action may be triggered by the usage rate exceeding the threshold amount. The amount of the item used to trigger an action may be determined in a number of ways. For example, the threshold amount may be a predetermined amount set by the management or set as a proportion of a previously used amount. Alternatively, the threshold amount may be dynamically determined. For example, the amount may be based upon the historical use data for a particular time or based on a particular event. In some embodiments, the data collected by the back office system 101 may be analyzed to predict an amount needed and take an action upon an indication that the amount is insufficient. For example, a model as described herein may be used to predict an expected consumption amount for a particular time period and/or an expected usage rate, which may then serve as the threshold amount. Considerations such as the consumption rate, the ordering rate, the number of customers in the establishment, any special events, and the like may be used to in the determination of the triggering amount. In some instances, the threshold amount may be the consumption rate itself, where an action is taken if the rate of consumption exceeds a certain value. In some embodiments, multiple thresholds may be used, and the action may be taken if and when the inventory amount triggers an action based on one or more of the thresholds.

In step 310, the back office system 101 receives an updated stocked quantity of the item, based on the initial stocked quantity of the item and the amount of the item that was taken from the inventory supply 107 onto the floor. In step 311, the back office system 101 determines whether the updated stocked quantity is less than a threshold amount and/or exceeds or triggers any other applicable threshold. If the back office system 101 determines that the updated stocked quantity does not trigger an action based on a threshold, then, in step 312, the back office system 101 waits for another order to be processed.

If the back office system 101 determines that the updated stocked quantity triggers an action based on the threshold amount, then in step 313 the back office system 101 updates the menu item availability data 124 so as to indicate that the particular item is not available, and then in step 312 the system waits for another order to be processed. Upon the system determining that the updated stocked quantity is less than the threshold amount and/or that another action is triggered based on one or more threshold amounts (e.g., the usage rate), the back office system 101 may also proceed to step 314 and create and/or update and/or submit a purchase order for requesting more of the item to be purchased from a supplier, and then in step 312 the system waits for another order to be processed.

In an embodiment in which the electronic menu is dynamically updated, the back office system 101 may, at step 315, update the electronic menu so that the item is no longer included in the electronic menu when the back office system 101 updates the menu item availability data 124 to indicate that the particular item is not available.

Figure 4:
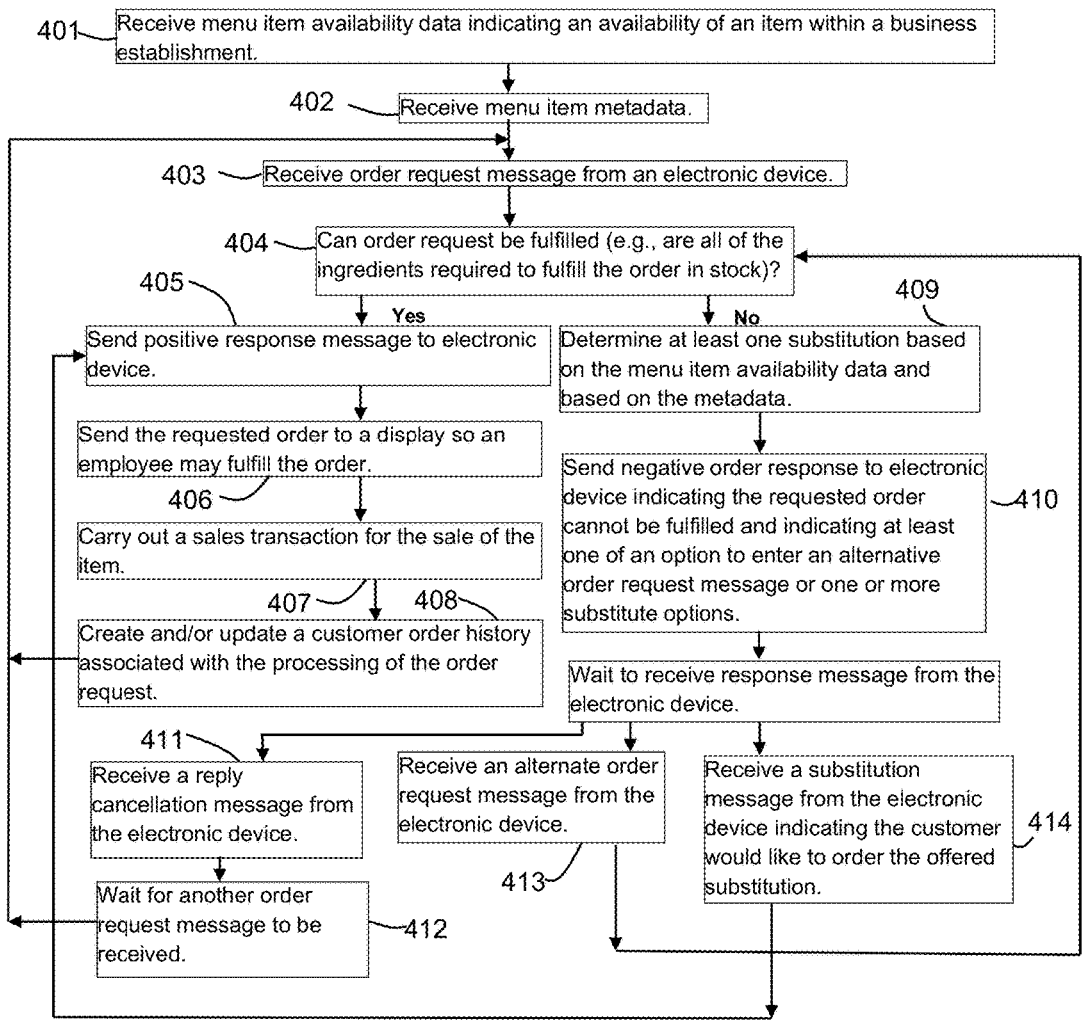
FIG. 4 is a method for placing an order via an electronic device according to an embodiment of the disclosure.

Turning now to FIG. 4, shown is a method 400 of ordering an item from a business establishment via an electronic device 104. In step 401, the back office system 101 determines menu item availability data 124. The menu item availability data 124 may be determined as described above in step 303 with reference to FIG. 3. In step 402, the system receives menu item metadata associated with interrelationships among menu items and ingredients of menu items. For example, the metadata may pertain to which ingredients typically accompany one another in various recipes, which ingredients are frequently substituted for one another, how various ingredients react with one another, etc. The metadata may be entered through any known means (e.g., entered manually by a user, downloaded from the internet, automatically determined from various inputs such as customer purchase history, etc.). In step 403, the back office system 101 receives an order request message 125 from the electronic device 104. Upon the back office system 101 receiving the order request message 125, the process moves to step 404 and the back office system 101 analyzes the order request message 125 and the menu item availability data 124 to determine whether or not the order request can be fulfilled (e.g., whether or not each item required to complete the order request is in stock and available).

If the back office system 101 determines that the order request can be fulfilled, then the process moves to step 405 and the back office system sends a positive response message 127 to the electronic device 104 for notifying the customer that the order request can be fulfilled. In step 406, the back office system sends the requested order to a display 103 so an employee may fulfill the order. In step 407, a sales transaction may take place to charge the customer for the order. In step 408, data associated with the order may be sent to the back office system 101 to create and/or update a customer order history associated with the customer's order request.

If, on the other hand, the back office system 101 determines that the order request cannot be fulfilled, then the back office system 101 moves to step 409 and determines at least one substitution. In some embodiments, the back office system 101 may determine a substitution based on the customer's purchase history and the current state of inventory. For example, when the customer sends the order request message 125 to the back office system 101, the order request message 125 may include data identifying the customer and/or the electronic device 104 to the back office system 101. Based on such data, the back office system 101 may identify a purchase history associated with the customer. The back office system 101 may analyze the customer's purchase history to determine at least one appropriate substitution. For example, if the order request message 125 from the customer is for a gin and tonic but the business establishment is out of gin, the back office system 101 may analyze the customer's order history to find that the customer usually orders whiskey and cola. The back office system 101 may then analyze the menu item availability data 124 to determine whether enough whiskey and cola are in stock so to fulfill an order request for a whiskey and cola. Upon the back office system 101 determining that sufficient amounts of whiskey and cola are in stock, the back office system 101 may promote transmission of a negative order response message 126 that indicates the establishment is out of gin and then asks the customer if the customer would like to: instead order a whiskey and cola, type in an alternate order request manually, or refrain from moving forward with the order.

In some embodiments, the back office system 101 may determine a substitution based on the metadata associated with interrelationships among menu items and ingredients of menu items. The metadata may pertain to which items typically accompany one another, which items are frequently substituted for one another, how various ingredients react with one another, etc. Thus, the back office system 101 may analyze the metadata to determine an appropriate substitution to offer the customer. For example, if the order request message 125 from the customer is for a gin and tonic, but the business establishment is out of gin, the back office system 101 may analyze the menu item metadata and establish that vodka is an appropriate substitution for gin. In some embodiments, the determination may be based on metadata indicating that many members of the public tend to substitute vodka for gin. In some embodiments, the determination may be based on metadata indicating that gin reacts to tonic water similarly to how vodka reacts to tonic water. In some embodiments, the determination may be based on metadata that was manually entered and indicates that vodka is an appropriate substitute option for gin. Upon the back office system 101 establishing at least one substitute (e.g., a vodka and tonic), the back office system 101 may then analyze the menu item availability data 124 to determine whether enough vodka and tonic water are in stock so to fulfill an order request for a vodka and tonic mixed beverage. Upon the back office system 101 determining that sufficient amounts of vodka and tonic water are in stock, the back office system 101 may promote transmission of a negative order response message 126 that indicates the establishment is out of gin and then asks the customer if the customer would like to instead: order a vodka and tonic, type in an alternate order request manually, or refrain from moving forward with the order.

In step 411, the electronic device 104 sends a reply cancellation message 130 to the back office system 101 indicating that the customer wishes to refrain from moving forward with the order, and thus the process moves to step 412 wherein the system waits for another order request message 125 to be received by the back office system 101.

In step 413, the electronic device 104 receives user input for an alternate order request and sends an alternate order request message 131 to the back office system 101 requesting an alternate order to purchase. Upon the back office system 101 receiving the alternate order request message 131, the process moves to step 404 and the back office system 101 analyzes the alternate order request message 131 and the menu item availability data 124 to determine whether or not the alternate order request can be fulfilled (e.g., whether or not each ingredient required to complete the alternate order request is in stock).

In step 414, the electronic device 104 receives user input indicating that the customer would like to order the offered substitution (e.g., the whiskey and cola or the vodka and tonic). In turn, the electronic device 104 sends a substitute order request message 132 to the back office system 101. Upon receiving the substitute order request message 132, the back office system begins processing the substitute order and thus sends a message indicating the substitute order request to the order preparation display 103. In turn, the bartender may make the beverage and serve it to the customer. The back office system 101 may send a positive order response message 127 to the electronic device 104 to communicate to the customer that the order is being processed. The process may then proceed to step 407, wherein a sales transaction takes place and the customer is charged for the order. In step 408, data associated with the order may be sent to the back office system 101 to create and/or update a customer order history associated with the customer's order.

In some embodiments, the electronic device 104 may be enabled to send a reply cancellation message 130 to the back office system 101 after placing an order. In this embodiment, the back office system 101 may track an order from placement to delivery to the customer. Upon receiving a cancellation request, the back office system 101 may determine, based on the order status within the preparation and delivery progression, whether or not the order can be cancelled. If the order can be cancelled, an order cancellation message may be sent to the electronic device 104. Alternatively, if the order cannot be cancelled, a message indicating that the order has already been prepared can be sent to the electronic device 104. The back office system 101 may actively track the orders and provide a visual indication of which orders can be cancelled on the electronic device by dynamically updating a purchase history list. For example, a list showing purchased items may display the items in grey that cannot be cancelled. In some embodiments, the electronic device 104 may enable a cancellation message to be sent to the back office system 101 indicating that the customer would like to cancel the order, and the order can be cancelled if possible without sending any messages to the electronic device 104.

In an embodiment, the system may use the collected data to perform data analysis and prediction for further use with the system. The system may perform the data analysis and prediction for the system itself, and in some embodiments, the data may be used to perform data analysis across various establishments and/or customers. As noted above, the back office system 101 may store data pertaining to customer order history in the database. Thus, the database may contain customer order history data related to numerous customer order histories from various customers. The back office system 101 may mine and analyze the data in the database to make determinations relating to customer ordering and thereby facilitate business operations. In some embodiments, the back office system 101 may comprise a rules engine to facilitate the data mining and/or analysis.

The back office system 101 may analyze the customer order history data received via the system 100. In some embodiments, the back office system 101 also receives data regarding customer order histories via external means. For example, in some embodiments, the back office system 101 may receive user input relating to general or known customer order histories and statistics and/or trends associated therewith. In some embodiments, the back office system may receive customer order history data from other businesses. For example, businesses may be associated with one another and/or in an agreement with one another so as to share customer order history data. As another example, the system may be operated by a third party, which may utilize information across multiple businesses and/or establishments. Based on the customer order history data, the back office system 101 may draw various conclusions. For example, the back office system 101 may determine patterns and/or trends associated with particular customers and/or groups of customers. For example, the back office system 101 may detect which items are generally purchased together, which items are frequently substituted for each other, purchasing habits and/or patterns indicated by customers and/or groups of customers, etc.

In some embodiments, the database may also contain data relating to external conditions and/or events. For example, the database may contain data associated with the weather conditions in the location of the business establishment (e.g., which season it is, the temperature, whether or not it is raining or snowing, etc.); an economy (e.g., information relating to stock market performances, volatility, an indication of a general state of a local, national, and/or global economy); sports (e.g., which sports are actively in season, rankings among sports teams, which sports teams are currently playing or will be playing one another, etc.); or any other data that may be relevant.

Based on the external conditions data and the customer order history data, the back office system 101 may draw conclusions relating to how external conditions affect customer behavior. In some embodiments, the back office system 101 analyzes the customer order history data and external condition data along with the menu item availability data and/or the metadata also stored in the database. In turn, the back office system 101 may determine interrelationships among customer behavior, external factors, inventory, and the menu items.

In some embodiments, the back office system 101 may make determinations based on the data and utilize the determinations to facilitate business operations. For example, the business may comprise a sports bar that provides a television for display to its customers, and back office system 101 may acquire data regarding which shows are presented to the patrons and when they are presented, as well as which shows are scheduled to be presented to the patrons in the future (e.g., via a television guide, a scheduled recordings listing, etc.).

The customer order history data and the external conditions data received by the back office system may indicate that a high number of orders for a particular Chicago microbrew beer are requested whenever the television presents a Chicago football game. The back office system may thus submit and/or prompt submission of a purchase order for the Chicago microbrew such that a certain quantity of the Chicago microbrew will be in stock whenever a Chicago football game is scheduled to be on the television. On the day of a Chicago football game, the back office system 101 may also promote transmission of a message to be displayed to employees indicating that large amounts of the Chicago microbrew will likely be purchased and therefore more of the beer should be taken from the stock room to the floor, added to more beer taps, etc.

In some embodiments, the back office system 101 may determine appropriate substitution suggestions based on the mined data. For example, the back office system 101 may determine that when a Chicago football game is on the television, high volumes of customers submit via an electronic device 104 order requests for the Chicago microbrew. The back office system 101 may also determine that during a Chicago football game, if a negative response message is sent to an electronic device (e.g., the bar is out of stock of the Chicago microbrew), then the back office system 101 receives a high amount of reply cancellations messages (e.g., the Chicago fans would rather leave and go to a different establishment serving the particular beer than remain at the establishment and order a substitute). In contrast, the back office system 101 may also determine that when a New York football game is displayed on the television, high volumes of customers submit via an electronic device 104 order requests for a particular New York microbrew beer. The back office system 101 may also determine that during a New York football game, if a negative response message is sent to an electronic device (e.g., the bar is out of stock of the New York microbrew), then the back office system 101 receives a lower amount of reply cancellations messages than it receives after a negative response message is sent for the Chicago microbrew (e.g., the New York fans would rather stay at the bar and order a substitute beer than go to a different establishment). Hence, the back office system 101 determines that the New York customers are more likely to stay at the bar and continue ordering substitute beers than the Chicago customers.

Therefore, in order to maximize the number of customers purchasing from the establishment, the back office system 101 may take steps to ensure that a sufficient amount of the Chicago microbrew beer is in stock whenever a Chicago football game is displayed on the television. Thus, if a Chicago football game is scheduled to be displayed at the bar on a Sunday, and if on Wednesday a customer sends an order request via an electronic device 104 requesting a Texas beer that is out of stock, then the back office system 101 may send a negative response message 126 offering the New York microbrew (instead of the Chicago microbrew) as the substitute choice to thereby try to conserve the stock of the Chicago microbrew.

In an embodiment, the back office system 101 may use the data to determine an appropriate substitution for a particular customer. For example, the database may contain data indicating that a particular customer very rarely orders vodka on Sundays through Thursdays but frequently orders vodka on weekends. If, upon the customer transmitting an order request message requesting a gin and tonic, the back office system 101 determines the bar is out of stock of gin, then the back office system 101 will determine which day of the week it is. If it is Monday, then the back office system 101 may send a negative response message containing a substitution recommendation for an item other than vodka (e.g., a rum and cola). If, on the other hand, the back office system 101 determines that it is a Saturday, then the back office system 101 may send a negative response message containing a substitution recommendation for a vodka and tonic.

The back office system 101 may also use the data to adjust price and thereby maximize profits. In adjusting the price, the back office system 101 may control the point of sale terminal as well as alter the price shown to customers on the electronic menu. The back office system 101 may alter the price based on supply and demand. For example, if the business establishment is a bar and the back office system 101 analyzes the menu item availability data to determine that the bar is running out of stock of tequila (e.g., supply is low) while the volume of order requests is not changing significantly (e.g., demand is remaining substantially constant) then the back office system 101 may automatically increase the price of tequila. The back office system 101 may also use external conditions data to predict the supply and demand of particular items to thereby adjust the price. For example, the back office system 101 may receive external conditions data indicating that a large snow storm is going to strike the vicinity over the course of the evening. The database may contain customer purchase history data indicating a direct correlation between how heavily it is snowing and how many order requests for scotch the back office system 101 receives (e.g., demand will increase throughout the night). In turn, the back office system 101 may program the price of scotch to gradually increase over the course of the evening.

The back office system 101 may utilize customer purchase history data that is shared among a plurality of business establishments. For example, the bar may enter into an agreement with other neighboring bars located nearby. In some embodiments, the bar and neighboring bars may share data within their databases. In other embodiments, the bar and neighboring bars may each communicate with a single database. For example, the system may be provided as a service by a third party. The third party may then collect the information from all of the relevant businesses and supply the information to the other businesses in various forms. The bar may analyze the data from the neighboring bars to detect customer ordering trends within the vicinity in substantially real time. For example, the back office system 101 may determine that several neighboring bars are experiencing high volumes of order requests for high priced wine. In turn, the back office system 101 may transmit a message to the management display indicating that more wine should be taken from the stock room onto the floor, bartenders knowledgeable about wine should stay on the floor, etc. Furthermore, the back office system 101 may analyze the metadata to determine that customers who order wine often order cheese platters as well. Hence, the back office system 101 may transmit a message to the management display 102 prompting employees to begin preparing cheese platters.

The back office system may also transmit promotional messages to an electronic device based on data in the database including customer order history data. For example, the back office system may determine that certain customers frequently purchase a particular wine. If the bar engages in a promotional arrangement with the particular wine vineyard and the bar agrees to distribute coupons to a limited number of customers, then the back office system will automatically determine which customers should receive the coupons based on which customers most frequently purchase the wine from the bar.

The data in the database and the analysis thereof may also be used in the making of business decisions by the bar owner and/or by other individuals or entities. For example, the analyzed information may be valuable in making decisions as to whether a new bar should come into the neighborhood and/or how advertisers and product manufacturers can maximize their profits from the customers.

The system can be implemented as an add-on to an existing point-of-sale system. Alternatively, the system could be implemented as a standalone application running on one or more devices. For example, the system may be considered a point-of-sale application that can operate on any device (e.g., tablets, smartphones, or computers), including the business establishment's devices and/or the customer's device(s). While the system can run and operate on a single device, the system could also include a distributed configuration in which one or more aspects of the system operate on a plurality of devices in communication with each other. For example, the app providing the electronic menu could potentially integrate with the rest of this system (ordering, dynamic menu, inventory management, drink making instructions, etc.).

When the system is provided as a point-of-sale replacement, the system may take the form of an application on one or more electronic devices. The resulting system could operate either with a cloud-based back office server, a local back office server, or for some smaller businesses, the system could be installed entirely on one or more local, portable devices. When multiple devices are present, the devices would authenticate with one another and the local or cloud server. Any number of authentication protocols can be used to properly authenticate the devices and/or applications executing on the devices with the business establishment's system (including the local or cloud based system). Once connected to the business establishment's system, the devices may communicate and serve as a portion or extension of the overall system. For example, the business establishment may supply a tablet that is authenticated to the business establishment's system for use in presenting the electronic menu and electronic device interface for customers visiting the business establishment. In some embodiments, the customers may use their own electronic device that is pre-loaded with the application. Upon arriving at the business establishment, or in some cases beforehand, the customers may authenticate to the business establishments system so that the customer's device serves as the electronic interface during their visit to the business establishment. In those cases where the customers authenticate remotely, the customer's device may be used to pre-order items for in-store consumption or take-out. Thus, the system could be easily scaled for any particular business establishment simply based on the number of devices interfacing with a back office system.

Further, the system may be associated with any number of business establishments. For example, in some embodiments the back office system 101 may comprise a computer located at or near the business establishment premises. In such cases, the herein described system may operate within a single, centrally located communications system. In some embodiments, the back office system 101 may comprise a server overseeing numerous business establishments and located remotely from the premises (e.g., the numerous business establishments may comprise a chain of restaurants and the server may reside at a business headquarters associated with the chain), using, for example, a cloud-based computing service as described above. In such cases, the herein described system may operate over any type of data communications network. In some embodiments, the system and methods described herein can be implemented as a service (e.g., software as a service). In this embodiment, the back office server or back office server function and/or the various other functions (e.g., inventory management and ordering, communication systems, etc.) may be implemented in a cloud-based computing environment. The system may then have access to data from a number of related or unrelated businesses and/or establishments. The various data mining and analysis functions may then be performed on the cloud based system. In this embodiment, the establishments may utilize only portable devices, which may operate the interface as a thin client. Such a system may be beneficial in providing a low-cost, scalable system for any particular establishment.

The system could include a number of default templates for presenting the various aspects of information to the employees, management, and customers. A restaurant or bar owner can start with a template to begin, but the system would allow the owner or system administrator to easily create, drag and drop buttons (like icons on a computer desktop or an iPhone), rename them, change what they do in an easy-to-use interface, and the like. For example, the menus could be customized using the system to change colors, nest menu selections and themes, add widgets to the menus (like Google Maps, top 10 drinks ordered tonight, drinks that famous people have ordered, etc.), and change various aspects of the system and electronic displays on the electronic devices. When a cloud-based system is utilized, the service provider could provide various design and template modification/customization services.

Unlike current point-of-sale systems where the updates (e.g., software updates) are pushed out from the franchisee/manufacturer/etc., the bar owner could distribute (e.g., push) the system updates that they make out to other devices within their bar ecosystem. For example, if the system presents a grid interface (e.g., a 10×10 display) and the system administrator, such as a bar owner, made a button bigger, changed the price of a drink, or moved a button around, the system would distribute the change(s) to the other devices (e.g., one on another floor, behind the bar, on a server's iPhone, etc). Thus, the system would enhance the interaction between the various components of the system, such as the electronic menu, displaying items that were ordered, and with the inventory management component (alerting you that you were out of vodka, etc).

While some of the above described examples pertain to beverages, it will be readily apparent to those skilled in the art that the current systems and methods can be employed to integrate business operations relating to food purchases or any other type of item for purchase.

Figure 5:
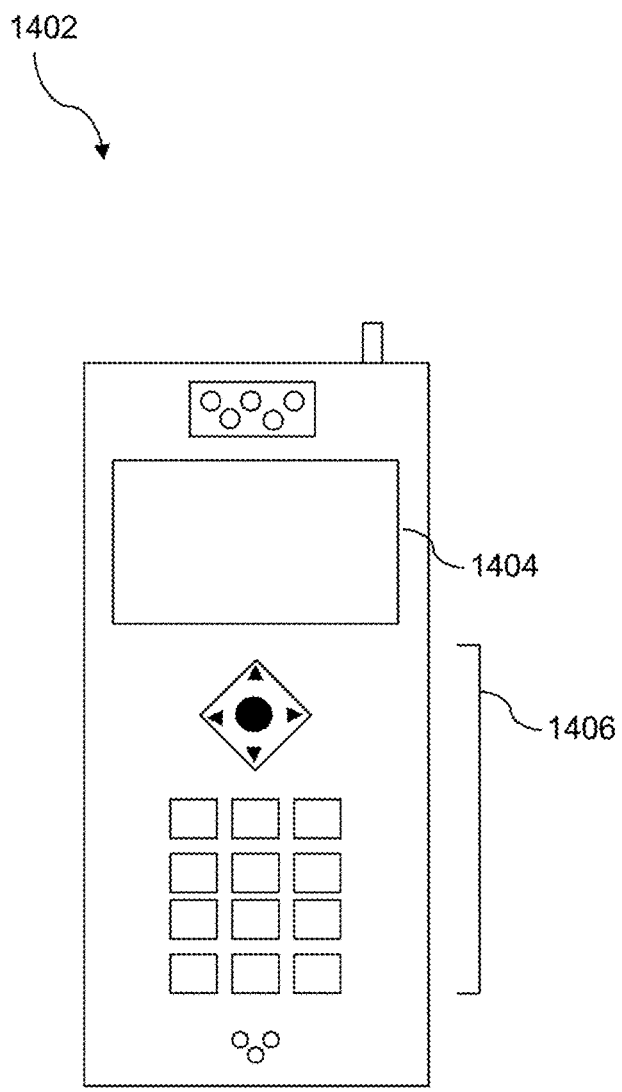
FIG. 5 is an illustration of a handset according to an embodiment of the disclosure.

Turning now to FIG. 5, a wireless communications system including the mobile device 1402 is described. FIG. 5 depicts the mobile device 1402, which is operable for implementing aspects of the present disclosure, but the present disclosure should not be limited to these implementations. Though illustrated as a mobile phone, the mobile device 1402 may take various forms, including a wireless handset, a pager, a personal digital assistant (PDA), a gaming device, or a media player. The mobile device 1402 includes a display 1404 and a touch-sensitive surface and/or keys 1406 for input by a user. The mobile device 1402 may present options for the user to select, controls for the user to actuate, and/or cursors or other indicators for the user to direct. The mobile device 1402 may further accept data entry from the user, including numbers to dial or various parameter values for configuring the operation of the handset. The mobile device 1402 may further execute one or more software or firmware applications in response to user commands. These applications may configure the mobile device 1402 to perform various customized functions in response to user interaction. Additionally, the mobile device 1402 may be programmed and/or configured over-the-air, for example from a wireless base station, a wireless access point, or a peer mobile device 1402. The mobile device 1402 may execute a web browser application which enables the display 1404 to show a webpage. The webpage may be obtained via wireless communications with a base transceiver station, a wireless network access node, a peer mobile device 1402 or any other wireless communication network or system.

Figure 6:
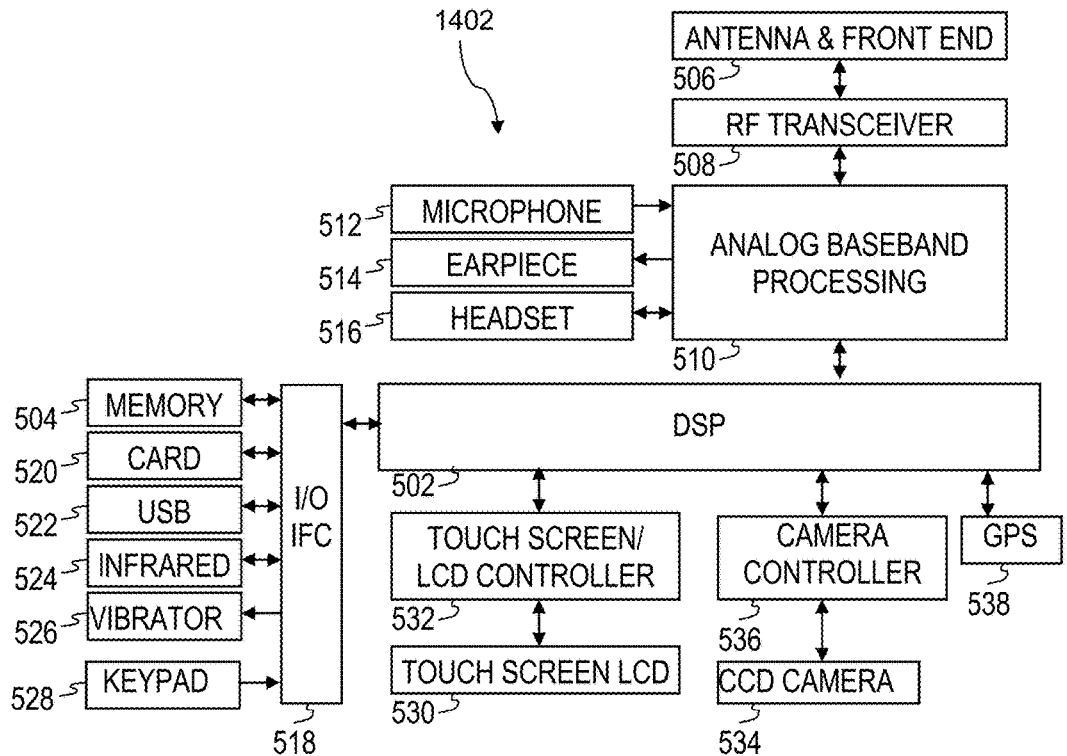
FIG. 6 is a block diagram of a handset according to an embodiment of the disclosure.

Turning now to FIG. 6, a block diagram of the mobile device 1402 is described. While a variety of known components of handsets are depicted, in an embodiment a subset of the listed components and/or additional components not listed may be included in the mobile device 1402. The mobile device 1402 includes a digital signal processor (DSP) 502 and a memory 504. As shown, the mobile device 1402 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, a global positioning system (GPS) receiver 538, and a near field communication reader and/or transmitter. In an embodiment, the mobile device 1402 may include another kind of display that does not provide a touch sensitive screen. In an embodiment, the DSP 502 may communicate directly with the memory 504 without passing through the input/output interface 518. Additionally, in an embodiment, the mobile device 1402 may comprise other peripheral devices that provide other functionality.

The DSP 502 or some other form of controller or central processing unit operates to control the various components of the mobile device 1402 in accordance with embedded software or firmware stored in memory 504 or stored in memory contained within the DSP 502 itself. In addition to the embedded software or firmware, the DSP 502 may execute other applications stored in the memory 504 or made available via information carrier media, such as portable data storage media like the removable memory card 520, or via wired or wireless network communications. The application software may comprise a compiled set of machine-readable instructions that configure the DSP 502 to provide the desired functionality, or the application software may comprise high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 1402 to function as a peripheral device to exchange information with a personal computer or other computer system. The infrared port 524 and other optional ports such as a Bluetooth® interface or an IEEE 802.11 compliant wireless interface may enable the mobile device 1402 to communicate wirelessly with other nearby handsets and/or wireless base stations.

The keypad 528 couples to the DSP 502 via the interface 518 to provide one mechanism for the user to make selections, enter information, and otherwise provide input to the mobile device 1402. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 1402 to determine its position.

Figure 7:
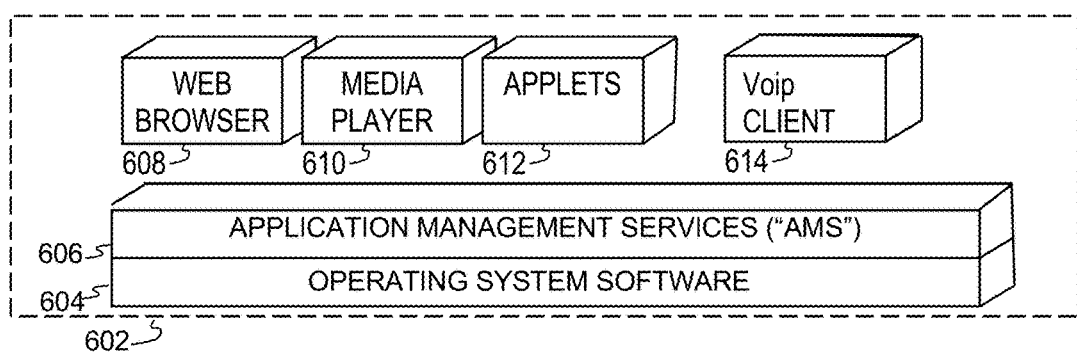
FIG. 7 is a block diagram of a software architecture of a handset according to an embodiment of the disclosure.

Turning now to FIG. 7, a software environment 602 that may be implemented by the DSP 502 is described. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 1402. Also shown in FIG. 7 are a web browser application 608, a media player application 610, JAVA applets 612, and a voice over internet protocol (VoIP) client 614. The web browser application 608 may be executed by the mobile device 1402 to browse content and/or the Internet: for example, when the mobile device 1402 is coupled to a network via a wireless link. The web browser application 608 may permit a user to enter information into forms and select links to retrieve and view webpages. The media player application 610 may be executed by the mobile device 1402 to play audio or audiovisual media. The JAVA applets 612 may be executed by the mobile device 1402 to provide a variety of functionality including games, utilities, and other functionality.

Figure 8:
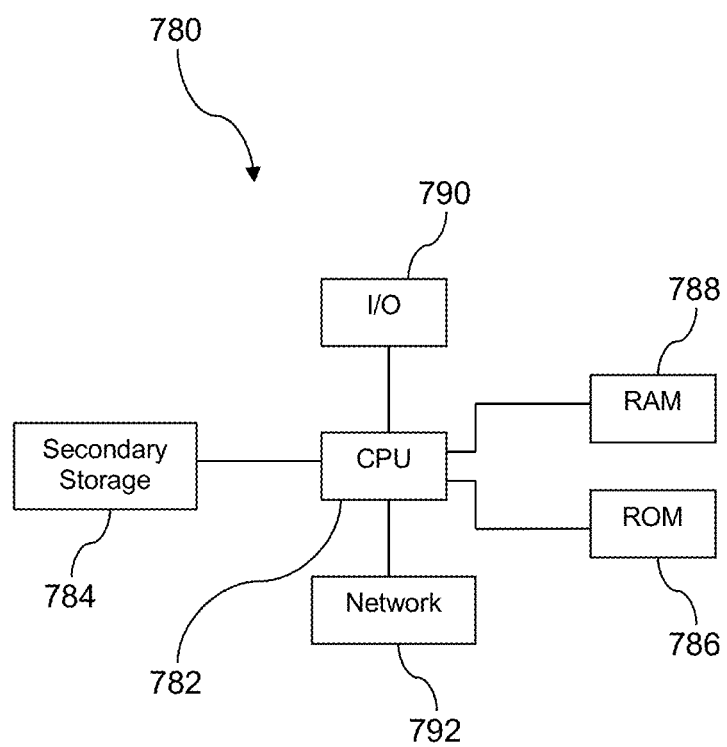
FIG. 8 illustrates an exemplary computer system suitable for implementing some aspects of the several embodiments of the disclosure.

Turning now to FIG. 8, a computer system 780 suitable for implementing one or more embodiments disclosed herein is described. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 712. The processor 782 may be implemented as one or more CPU chips.

It is understood that by programming and/or loading executable instructions onto the computer system 780, at least one of the CPU 702, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software because re-spinning a hardware implementation is more expensive than re-spinning a software design. Generally, a design that is stable and will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner that a machine controlled by a new ASIC is a particular machine or apparatus, a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if the RAM 788 is not large enough to hold all working data. The secondary storage 784 may be used to store programs which are loaded into the RAM 788 when such programs are selected for execution. The ROM 786 is used to store instructions and perhaps data which are read during program execution. The ROM 786 is a non-volatile memory device which typically has a small memory capacity relative to the larger memory capacity of the secondary storage 784. The RAM 788 is used to store volatile data and perhaps to store instructions. Access to both the ROM 786 and the RAM 788 is typically faster than to the secondary storage 784. The secondary storage 784, the RAM 788, and/or the ROM 786 may be referred to in some contexts as computer readable storage media and/or non-transitory computer readable media.

The I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, near field communication devices (e.g., RFID readers/transmitters), Bluetooth communication components, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using the processor 782, may be received from and outputted to the network: for example, in the form of a computer data signal embodied in a carrier wave.

Such information, which may include data or instructions to be executed using the processor 782, for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, and/or scripts which it accesses from hard disk, floppy disk, optical disk (these various disk-based systems may all be considered secondary storage 784), the ROM 786, the RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784—for example, hard drives, floppy disks, optical disks, and/or other devices, the ROM 786, and/or the RAM 788—may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage mediums having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product: for example, by reading from a CD-ROM disk inserted into a disk drive peripheral of the computer system 780. Alternatively, the processor 782 may process the executable instructions and/or data structures by remotely accessing the computer program product: for example, by downloading the executable instructions and/or data structures from a remote server through the network connectivity devices 712. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788 likewise may be referred to as a non-transitory computer readable medium in that, while the dynamic RAM receives electrical power and is operated in accordance with its design, for example during a period of time during which the computer 700 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

Having described various systems and method herein, various embodiments may include, but are not limited to:

In a first embodiment, a system for integrating business operations comprises a back office system comprising a memory, a processor, and at least one application stored in the memory. When executed by the processor, the application configures the processor to receive an order request message from an electronic device, where the order request message indicates a request to purchase at least a portion of an item, analyze menu item availability data to determine whether the order request can be fulfilled based on an availability of the item, and send an order response message based on the menu item availability data. In a second embodiment, the order response message of the first embodiment may indicate whether or not the request for the order can be fulfilled based on the menu item availability data. In a third embodiment, the application of the second embodiment may further configure the processor to determine that the order cannot be fulfilled based on the menu item availability data, and upon determining that the order cannot be fulfilled, may send a negative order response message containing at least one alternate order option. In a fourth embodiment, the alternate order option of the third embodiment may be determined based on the menu item availability data and metadata, and the metadata may relate to at least one of interrelations among items and/or ingredients, purchase history data relating to at least one customer, or scientific information relating to how various items and/or ingredients react with one another. In a fifth embodiment, the application of any of the first to fourth embodiments may further configure the processor to automatically charge the customer for the purchase based on a determination that the order request can be fulfilled. In a sixth embodiment, the application of the third embodiment may further configure the processor to update an electronic menu to remove the item from the electronic menu based on the menu item availability data. In a seventh embodiment, the application of the third embodiment may further configure the processor to update an electronic menu to remove all menu items that contain the item from the electronic menu based on the menu item availability data.

In an eighth embodiment, a method for monitoring inventory comprises receiving stocked quantity input indicating an initial stocked quantity of an item in a first location of a business establishment, receiving use quantity input indicating an initial use quantity of the item in a second location of a business establishment, determining menu item availability data based on the initial stocked quantity and the initial use quantity, receiving stocked modification input indicating that the initial stocked quantity of the item has been modified, determining whether the modified stocked quantity is less than a predetermined amount, upon determining that the modified stocked quantity is less than a predetermined amount, updating the menu item availability data, receiving an order request message requesting fulfillment of a purchase of at least a portion of the item, and analyzing the updated menu item availability data to determine whether to fulfill the order request. In a ninth embodiment, the method of the eighth embodiment may also include receiving use modification input indicating that the initial use quantity of the item has been modified, determining whether the modified use quantity is less than a predetermined amount, and upon determining that the modified use quantity is less than the predetermined amount, prompting the modification of the stocked quantity. In a tenth embodiment, the use modification input of the ninth embodiment may be received from an inventory use tracking means configured to track in substantially real-time an amount of the item that is used. In an eleventh embodiment, the inventory use tracking means of the tenth embodiment may comprise at least one of a point-of-sale terminal, an electronic spout, a motion sensing means, a weight sensor, or means for receiving manual user input. In a twelfth embodiment, the method of any of the eighth to eleventh embodiments may also include promoting at least one of submitting a new purchase order for a purchase of the item from a supplier or updating an existing purchase order for a purchase of the item from a supplier upon determining that the modified stock quantity is less than the predetermined amount. In a thirteenth embodiment, the stocked modification input of any of the eighth to twelfth embodiments may be received from a stocked inventory tracking means comprising a scale configured to determine the amount of a stocked item based on weight. In a fourteenth embodiment, prompting the modification of the stocked quantity in any of the eighth to thirteenth embodiments may comprise promoting transmission of a message to a display, and the message may indicate a need to transport some of the item from the first location to the second location. In a fifteenth embodiment, the business establishment in any of the eighth to fourteenth embodiments may be associated with the food services industry. In a sixteenth embodiment, the order request in any of the eighth to fifteenth embodiments may be received from a mobile communications device.

In a seventeenth embodiment, a method for receiving and processing a customer order comprises receiving menu item availability data indicating the availability of an item within a business establishment; receiving a first order request message from a first electronic device, wherein the first order request message requests fulfillment of a first purchase of at least a portion of the item; determining whether the first order request can be fulfilled based on the menu item availability data; upon determining the first order request can be fulfilled, prompting a fulfillment of the first order request; modifying the menu item availability data based on the fulfillment the first order request; receiving a second order request message from a second electronic device, wherein the second order request message requests fulfillment of a second purchase of at least a portion of the item; and determining whether the second order request can be fulfilled based on the modified menu item availability data. In an eighteenth embodiment, upon the determination that the first order request can be fulfilled in the seventeenth embodiment, sending a positive order response message to the electronic device indicating that the first order request can be fulfilled. In a nineteenth embodiment, the method of the seventeenth or eighteenth embodiment may also include determining the second order request cannot be fulfilled based on the modified menu item availability data; upon determining the second order request cannot be fulfilled, determining at least one alternate purchase option; and sending a negative order response message to the electronic device. The negative order response message may contain an indication of the at least one alternate purchase option. In a twentieth embodiment, determining the at least one alternate purchase option in the nineteenth embodiment may comprise analyzing metadata. The metadata may relate to at least one of interrelations among items and/or ingredients, purchase history data relating to at least one customer, or scientific information relating to how various items and/or ingredients react with one another. In a twenty first embodiment, determining the at least one alternate purchase option in the nineteenth or twentieth embodiment may comprise analyzing the modified menu item availability data to determine whether the alternate purchase option is available. The alternate purchase option may be contained in the negative order response message only if the alternate purchase option is available. In a twenty second embodiment, the method of any of the eighteenth to twenty first embodiments may also include receiving an alternate order request message from the second electronic device, where the alternate order request message can request fulfillment of a purchase of the alternate purchase.

In a twenty-third embodiment, a dynamic menu system comprises a server comprising a memory and a processor, a menu store, an inventory store, and at least one application stored in the memory. The menu store comprises a plurality of menu items associated with an establishment, and each menu item of the plurality of menu items comprises one or more ingredients of a plurality of ingredients. The inventory store comprises a record of an amount of the plurality of ingredients available at the establishment. The at least one application stored in the memory, when executed by the processor, configures the processor to: provide a first selection of the plurality of menu items to an electronic device, update the inventory store to indicate that less than the certain amount of the first ingredient is available, and provide a second selection of the plurality of menu items to the electronic device. The first selection of the plurality of menu items comprises a first menu item made from at least a certain amount of a first ingredient of the plurality of ingredients, and the second selection of the plurality of menu items does not include the first menu item. The first menu item is made with more than the certain amount of the first ingredient, and the electronic device only displays the second selection of the plurality of menu items. In a twenty-fourth embodiment, the at least one application of the twenty-third embodiment may further configure the processor to: receive a usage record. The usage record may comprise an amount of the first ingredient used at the establishment, and the application may configure the processor to update the inventory store in response to receiving the usage record. In a twenty-fifth embodiment, the at least one application of the twenty-third or twenty-fourth embodiment may further configure the processor to receive an order request message from the electronic device, wherein the order request message indicates a request to purchase at least a portion of a menu item of the plurality of menu items. In a twenty-sixth embodiment, the at least one application of the twenty-fifth embodiment may further configure the processor to: send an order preparation message to an order preparation display based on the order request message. In a twenty-seventh embodiment, the menu store of the twenty sixth embodiment may also include preparation instructions for each menu items of the plurality of menu items, and the at least one application may further configure the processor to: include preparation instructions for the menu item in the order request message. In a twenty-eighth embodiment, the at least one application of the twenty-sixth or twenty-seventh embodiment may further configure the processor to update the inventory store based on sending the order preparation message. In a twenty-ninth embodiment, the at least one application of any of the twenty-fifth to twenty-eighth embodiments may further configure the processor to provide a menu item suggestion to the electronic device based on the order request message. In a thirtieth embodiment, the at least one application of any of the twenty-fifth to twenty-ninth embodiments may further configure the processor to: provide an advertisement to the electronic device based on the order request message. In a thirty-first embodiment, the at least one application of any of the twenty-third to thirtieth embodiments may further configure the processor to receive payment information from the electronic device; and process the payment information. In a thirty-second embodiment, at least one of the first selection of the plurality of menu items or the second selection of the plurality of menu items in any of the twenty third to thirty first embodiments may comprise at least one of a photograph of at least one menu item, nutritional information for the at least one menu item, an ingredients list for the at least one menu item, or a source identification of the ingredients list for the at least one menu item. In a thirty-third embodiment, the at least one application of any of the twenty-third to thirty second embodiments may further configure the processor to send at least one advertisement to the electronic device. In a thirty-fourth embodiment, the system of any of the twenty-third to thirty-third embodiments may also include a second menu store comprising a plurality of menu items associated with a second establishment. In a thirty-fifth embodiment, the at least one application of the thirty-fourth embodiment may further configure the processor to: provide a third selection of the plurality of menu items to a second electronic device at the second establishment. In a thirty-sixth embodiment, the at least one application of any of the twenty-third to thirty-fifth embodiments may further configure the processor to: select the second selection of the plurality of menu items based on a purchase history of the first selection of the plurality of menu items. In a thirty-seventh embodiment, the at least one application of any of the twenty-third to thirty-sixth embodiments may further configure the processor to: analyze the inventory store based on the update to the inventory store, and adjust a price of the second selection of the plurality of menu items. The at least one application may be configured to adjust the price prior to providing the second selection of the plurality of menu items to the electronic device.

In a thirty-eighth embodiment, a method of providing a dynamic menu at an establishment comprises displaying, on an electronic device, a first plurality of menu items; receiving a selection of a first menu item of the plurality of menu items; sending, by the electronic device, a menu selection message to a server, wherein the menu selection message comprises the selection of the first menu item; receiving a response message from the server, wherein the response message comprises a recommendation for one or more additional items; displaying, on the electronic device, the one or more additional items; and receiving, on the electronic device, a selection of a second item from the one or more additional items. In a thirty-ninth embodiment, the recommendation for the one or more additional items in the thirty-eighth embodiment may be based on an order history from the electronic device. In a fortieth embodiment, the recommendation for the one or more additional items in the thirty-eighth or thirty-ninth embodiment may be based on an order history for the establishment. In a forty-first embodiment, the recommendation for the one or more additional items in any of the thirty-eighth to fortieth embodiments may be based on an order history for a plurality of establishments. In a forty-second embodiment, the recommendation for the one or more additional items in any of the thirty-eighth to forty-first embodiments may be based on a time that the selection of the first menu item is received. In a forty-third embodiment, the time in the forty-second embodiment may comprise at least one of a time of day, a day of the week, or a season. In a forty-fourth embodiment, the one or more additional items in any of the thirty-eighth to forty-third embodiments may comprise at least one of an item previously purchased with the first menu item by one or more customers, or an item previously substituted for the first menu item by one or more customers. In a forty-fifth embodiment, the recommendation for the one or more additional items in any of the thirty-eighth to forty-fourth embodiments may be based on a predicted amount of an item. In a forty-sixth embodiment, the one or more additional items in any of the thirty-eighth to forty-fifth embodiments may comprise an advertisement. In a forty-seventh embodiment, the advertisement of the forty-sixth embodiment may be associated with the first menu item.

In a forty-eighth embodiment, a method of dynamically controlling an inventory comprises receiving, by a server, use quantity information for a first item of a plurality of items, where the use quantity information comprises an amount of the first item used at an establishment, updating an inventory store based on the use quantity information, where the inventory store comprises quantity information for the plurality of items available at an establishment, comparing, by the server, the quantity information with a threshold amount for the first item of the plurality of items, generating, by the server, an order message for the first item based on the comparing, and receiving an additional quantity of the first item at the establishment in response to the generating of the order message. In a forty-ninth embodiment, the method of the forty-eighth embodiment may also include receiving, by the server, an order request message, sending the order request message to an order fulfillment display, and receiving the use quantity information in response to the receiving the order request message and sending the order request message to the order fulfillment display. In a fiftieth embodiment, the first item in the forty-eighth or forty-ninth embodiment may be an ingredient used in a first menu item. In a fifty-first embodiment, the first item in the forty-eighth embodiment may be a first menu item, the first item may comprise a plurality of ingredients, and the use quantity information may comprise a plurality of amounts corresponding to the plurality of ingredients. In a fifty-second embodiment, generating the order message in any of the forty eighth to fifty first embodiments may comprise automatically generating the order message for the first item. In a fifty-third embodiment, the threshold amount of any of the forty-eighth to fifty-second embodiments may comprise a predetermined inventory amount, and generating the order message may comprise generating the order message when the quantity information is below the predetermined inventory amount. In a fifty-fourth embodiment, the quantity of the first item in any of the forty-eight to fifty-second embodiments may comprise an amount of the first item used in a time period, the threshold amount may comprise an amount of the first item predicted to be used in the time period, and generating the order message may comprise generating the order message when the amount of the first item used in the time period is greater than the amount of the first item predicted to be used in the time period. In a fifty-fifth embodiment, the quantity of the first item in any of the forty-eighth to fifty-second embodiments may comprise a consumption rate of the first item, the threshold amount may comprise a predetermined consumption rate, and generating the order message may comprise generating the order message when the consumption rate of the first item is greater than the predetermined consumption rate.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic menu system comprising:
    a server comprising a memory and a processor;
    a menu store, wherein the menu store comprises a plurality of menu items associated with an establishment, wherein each menu item of the plurality of menu items comprises one or more ingredients of a plurality of ingredients;
    an inventory store, wherein the inventory store comprises a record of an amount of each of the plurality of ingredients available at the establishment;
    an order history store, wherein the order history store comprises customer order history data that comprises one or more records of customer orders received at the establishment;
    at least one application stored in the memory that, when executed by the processor, configures the processor to:
        provide a first selection of the plurality of menu items to an electronic device, wherein the first selection of the plurality of menu items comprises a first menu item made from at least a certain amount of a first ingredient of the plurality of ingredients;
        receive use quantity information for the first ingredient based on a customer order for the first menu item;
        update the customer order history data in response to the customer order for the first menu item;
        update the inventory store to indicate that less than a threshold amount of the first ingredient is available based on the use quantity information, wherein the threshold amount comprises at least one of an amount of the first ingredient used in a time period or a consumption rate of the first ingredient; and
        provide a second selection of the plurality of menu items to the electronic device based on the update to the inventory store, wherein the second selection of the plurality of menu items does not include the first menu item;
        wherein an order message is generated for a second ingredient at a second establishment based on the update to the customer order history data, and wherein an additional quantity of the second ingredient is received at the second establishment in response to the order message; and
    the electronic device comprising a dynamic display that:
        displays the first selection of the plurality of menu items, and
        subsequently displays only the second selection of the plurality of menu items based on the update to the inventory store.

2. The system of claim 1, wherein the use quantity information comprises an amount of the first ingredient used at the establishment in the time period, and wherein the application configures the processor to update the inventory store in response to receiving the use quantity information.

3. The system of claim 1, wherein the at least one application further configures the processor to: receive an order request message from the electronic device with the order, wherein the order request message indicates a request to purchase at least a portion of a menu item of the plurality of menu items.

4. The system of claim 3, wherein the at least one application further configures the processor to: send an order preparation message to an order preparation display based on the order request message.

5. The system of claim 4, wherein the menu store further comprises preparation instructions for each menu item of the plurality of menu items, and wherein the at least one application further configures the processor to: include preparation instructions for the menu item in the order request message.

6. The system of claim 4, wherein the at least one application further configures the processor to: update the inventory store based on sending the order preparation message.

7. The system of claim 3, wherein the at least one application further configures the processor to: provide a menu item suggestion to the electronic device based on the order request message.

8. The system of claim 3, wherein the at least one application further configures the processor to: provide an advertisement to the electronic device based on the order request message.

9. The system of claim 3, wherein the at least one application further configures the processor to:
send a response message to the electronic device, wherein the response message comprises a recommendation for one or more additional items, and wherein the one or more additional items are displayed on the electronic device.

10. The system of claim 9, wherein the recommendation for the one or more additional items is based on an order history for a plurality of establishments.

11. The system of claim 9, wherein the recommendation for the one or more additional items is based on a time that the order request message is received.

12. The system of claim 11, wherein the time comprises at least one of a time of day, a day of the week, or a season.

13. The system of claim 9, wherein the one or more additional items comprise at least one of an item previously purchased with at least the portion of the menu item of the plurality of menu items by one or more customers, or an item previously substituted for at least the portion of the menu item of the plurality of menu items by one or more customers.

14. The system of claim 9, wherein the recommendation for the one or more additional items is based on at least one of a predicted amount of an item, a current amount of the item, a usage rate of the item, or a consumption rate of the item.

15. The system of claim 9, wherein the recommendation for the one or more additional items is based on an order history from the electronic device.

16. The system of claim 9, wherein the recommendation for the one or more additional items is based on an order history for the establishment.

17. The system of claim 1, wherein the at least one application further configures the processor to: receive payment information from the electronic device; and process the payment information.

18. The system of claim 1, wherein at least one of the first selection of the plurality of menu items or the second selection of the plurality of menu items comprises at least one of a photograph of at least one menu item, nutritional information for the at least one menu item, an ingredients list for the at least one menu item, or a source identification of the ingredients list for the at least one menu item.

19. The system of claim 1, wherein the at least one application further configures the processor to: send at least one advertisement to the electronic device.

20. The system of claim 1, further comprising: a second menu store comprising a plurality of menu items associated with the second establishment.

21. The system of claim 20, wherein the at least one application further configures the processor to: provide a third selection of the plurality of menu items to a second electronic device at the second establishment, wherein the third selection of the plurality of menu items are displayed on the second electronic device.

22. The system of claim 1, wherein the at least one application further configures the processor to: select the second selection of the plurality of menu items based on a purchase history of the first selection of the plurality of menu items.

23. The system of claim 1, wherein the at least one application further configures the processor to: analyze the inventory store based on the update to the inventory store, and adjust a price of the second selection of the plurality of menu items, wherein the at least one application is configured to adjust the price prior to providing the second selection of the plurality of menu items to the electronic device.

24. The system of claim 1, wherein the at least one application further configures the processor to:
generate an order message for the first ingredient based on the update to the inventory store, wherein an additional quantity of the first ingredient is received at the establishment in response to the order message.

25. The system of claim 24, wherein the threshold amount further comprises a predetermined inventory amount, and wherein the at least one application further configures the processor to generate the order message when the quantity information is below the predetermined inventory amount.

26. The system of claim 24, wherein the threshold amount comprises the amount of the first ingredient used in the time period, and wherein the at least one application further configures the processor to generate the order message when the amount of the first ingredient used in the time period is greater than the amount of the first ingredient predicted to be used in the time period.

27. The system of claim 24, wherein the threshold amount comprises the consumption rate of the first ingredient, and wherein the at least one application further configures the processor to generate the order message when the consumption rate of the first ingredient is greater than the predetermined consumption rate.

28. The system of claim 1, wherein the at least one application further configures the processor to:
predict a usage of the first ingredient amount using a model.

29. The system of claim 1, wherein the at least one application further configures the processor to:
receive data for at least one event external to the establishment or the second establishment; and
generate the order message for the second ingredient at the second establishment further based on the at least one event.

30. The system of claim 29, wherein the at least one event external to the establishment or the second establishment comprises at least one of a weather event, an economic event, or a sporting event.

* * * * *